US011966573B2

(12) United States Patent
Markiewicz et al.

(10) Patent No.: US 11,966,573 B2
(45) Date of Patent: Apr. 23, 2024

(54) TEMPORARILY HIDING USER INTERFACE ELEMENTS

(71) Applicant: MICROSOFT TECHNOLOGY LICENSING, LLC, Redmond, WA (US)

(72) Inventors: Jan-Kristian Markiewicz, Redmond, WA (US); Jerome Stephen Healy, Seattle, WA (US); Tiffany Jamie Chen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/336,878

(22) Filed: Jun. 2, 2021

(65) Prior Publication Data

US 2022/0391080 A1 Dec. 8, 2022

(51) Int. Cl.
*G06F 3/04847* (2022.01)
*G06F 3/0483* (2013.01)
*G06F 3/04842* (2022.01)
*G06F 3/0486* (2013.01)
*G06F 9/451* (2018.01)

(52) U.S. Cl.
CPC ........ *G06F 3/04847* (2013.01); *G06F 3/0483* (2013.01); *G06F 3/04842* (2013.01); *G06F 3/0486* (2013.01); *G06F 9/452* (2018.02)

(58) Field of Classification Search
CPC ............... G06F 3/04847; G06F 3/0483; G06F 3/04842; G06F 3/0486; G06F 9/452
See application file for complete search history.

(56) References Cited

U.S. PATENT DOCUMENTS

| | | | | |
|---|---|---|---|---|
| 5,146,556 | A | * | 9/1992 | Hullot ................. G06F 3/04845 715/835 |
| 5,657,049 | A | * | 8/1997 | Ludolph ............... G06F 3/0481 715/835 |
| 5,659,693 | A | * | 8/1997 | Hansen ................. G06F 3/0481 715/779 |

(Continued)

OTHER PUBLICATIONS

"International Search Report and Written Opinion Issued in PCT Application No. PCT/US22/028247", dated Aug. 25, 2022, 14 Pages.

*Primary Examiner* — Haoshian Shih
*Assistant Examiner* — Alvaro R Calderon, IV
(74) *Attorney, Agent, or Firm* — Newport IP, LLC; Jacob P. Rohwer

(57) ABSTRACT

Technologies are disclosed for temporarily hiding user interface ("UI") elements, such as application windows or tabs. A request can be received to hide a UI element for a specified period of time. When such a request is received, the UI element is hidden and an identifier corresponding to the UI element is moved from a first area of a taskbar to a second area of the taskbar. The application presenting the UI element can be configured for reduced consumption of computing resources while the UI element is hidden. Additionally, notifications associated with the UI element can be disabled while the UI element is hidden. When the specified period of time to hide the UI element has elapsed, the UI element is once again displayed. Additionally, the identifier corresponding to the UI element is moved from the second area of the taskbar back to the first area of the taskbar.

15 Claims, 20 Drawing Sheets

(56) References Cited

U.S. PATENT DOCUMENTS

| | | | | |
|---|---|---|---|---|
| 5,757,371 | A * | 5/1998 | Oran | G06F 3/0482 715/779 |
| 5,819,055 | A * | 10/1998 | MacLean | G06F 3/0481 715/798 |
| 8,117,554 | B1 * | 2/2012 | Grechishkin | G06F 9/45558 715/764 |
| 8,723,823 | B2 * | 5/2014 | Shia | G06Q 10/10 345/173 |
| 9,317,195 | B1 * | 4/2016 | Grechishkin | G06F 3/04842 |
| 9,946,452 | B1 * | 4/2018 | Jitkoff | G06F 3/0486 |
| 2001/0035881 | A1 * | 11/2001 | Stoakley | G06F 3/0481 715/772 |
| 2004/0061716 | A1 * | 4/2004 | Cheung | G06F 9/542 715/710 |
| 2004/0212640 | A1 * | 10/2004 | Mann | G06F 3/0481 715/792 |
| 2005/0044058 | A1 * | 2/2005 | Matthews | G06F 9/4418 |
| 2005/0091670 | A1 * | 4/2005 | Karatal | G06F 8/10 715/762 |
| 2006/0123353 | A1 * | 6/2006 | Matthews | G06F 3/0481 715/779 |
| 2007/0044029 | A1 * | 2/2007 | Fisher | G06F 9/451 715/202 |
| 2007/0044039 | A1 * | 2/2007 | Amadio | G06F 9/451 715/847 |
| 2007/0074126 | A1 * | 3/2007 | Fisher | G06F 9/451 715/764 |
| 2007/0288860 | A1 * | 12/2007 | Ording | G06F 3/04842 715/779 |
| 2008/0052642 | A1 * | 2/2008 | Champion | G06F 3/0482 715/779 |
| 2008/0184159 | A1 * | 7/2008 | Selig | G06F 40/174 715/781 |
| 2008/0184222 | A1 * | 7/2008 | LaManna | G06F 8/61 717/174 |
| 2009/0083655 | A1 | 3/2009 | Beharie et al. | |
| 2010/0088692 | A1 * | 4/2010 | Rathi | G06F 8/65 717/171 |
| 2010/0211906 | A1 * | 8/2010 | Kanai | G06F 3/0481 715/779 |
| 2010/0313165 | A1 * | 12/2010 | Louch | G06F 9/451 715/792 |
| 2011/0307794 | A1 * | 12/2011 | Hilerio | H04L 67/02 717/177 |
| 2011/0307810 | A1 * | 12/2011 | Hilerio | G06F 3/0481 715/810 |
| 2011/0307811 | A1 * | 12/2011 | Kim | G06F 3/04842 715/760 |
| 2011/0307812 | A1 * | 12/2011 | Hilerio | G06F 16/986 715/810 |
| 2011/0307880 | A1 * | 12/2011 | Hilerio | H04L 67/02 717/176 |
| 2011/0307883 | A1 * | 12/2011 | Hilerio | G06F 9/451 715/810 |
| 2012/0005269 | A1 * | 1/2012 | Janssen | G06F 3/0481 709/203 |
| 2012/0023404 | A1 | 1/2012 | Liu et al. | |
| 2012/0054674 | A1 * | 3/2012 | Beykpour | G06F 3/0481 715/788 |
| 2012/0066630 | A1 * | 3/2012 | Kim | G06F 3/0488 715/810 |
| 2012/0166956 | A1 * | 6/2012 | Hilerio | G06F 9/44505 715/734 |
| 2012/0185789 | A1 * | 7/2012 | Louch | G06F 3/0488 715/769 |
| 2012/0185805 | A1 * | 7/2012 | Louch | G06F 3/04812 715/862 |
| 2013/0212524 | A1 * | 8/2013 | Nurse | G06F 40/166 715/788 |
| 2014/0109001 | A1 | 4/2014 | Louch et al. | |
| 2014/0372525 | A1 * | 12/2014 | Raghavan | G06Q 10/1093 709/204 |
| 2016/0139776 | A1 * | 5/2016 | Donahue | G06F 9/46 715/781 |
| 2016/0189328 | A1 * | 6/2016 | Vranjes | G06F 3/04886 345/173 |
| 2017/0285878 | A1 * | 10/2017 | VanBlon | G06F 3/04817 |
| 2017/0300183 | A1 * | 10/2017 | Barrus | G06F 16/9562 |
| 2018/0232114 | A1 * | 8/2018 | Saunshi | G06F 3/04817 |
| 2018/0329550 | A1 * | 11/2018 | Dellinger | G06F 3/04883 |
| 2020/0278775 | A1 * | 9/2020 | Tao | G06F 3/04886 |
| 2020/0326839 | A1 * | 10/2020 | Walkin | G06F 3/04845 |
| 2020/0333994 | A1 | 10/2020 | Sepulveda et al. | |
| 2020/0348824 | A1 * | 11/2020 | Rogers | H04M 1/72445 |
| 2020/0348825 | A1 * | 11/2020 | Rogers | G06F 3/0483 |
| 2021/0200431 | A1 * | 7/2021 | Xiao | G06F 9/542 |

\* cited by examiner

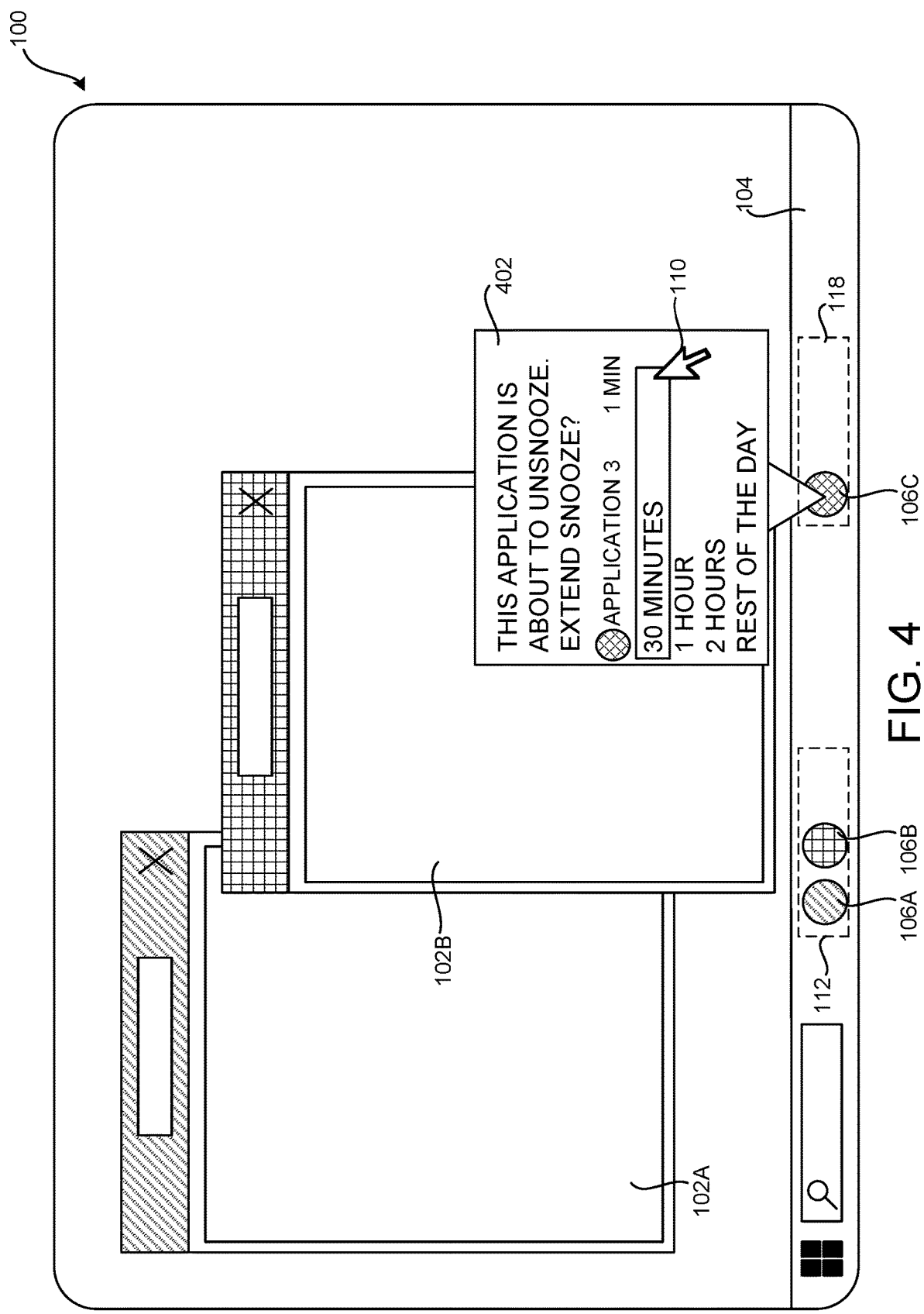

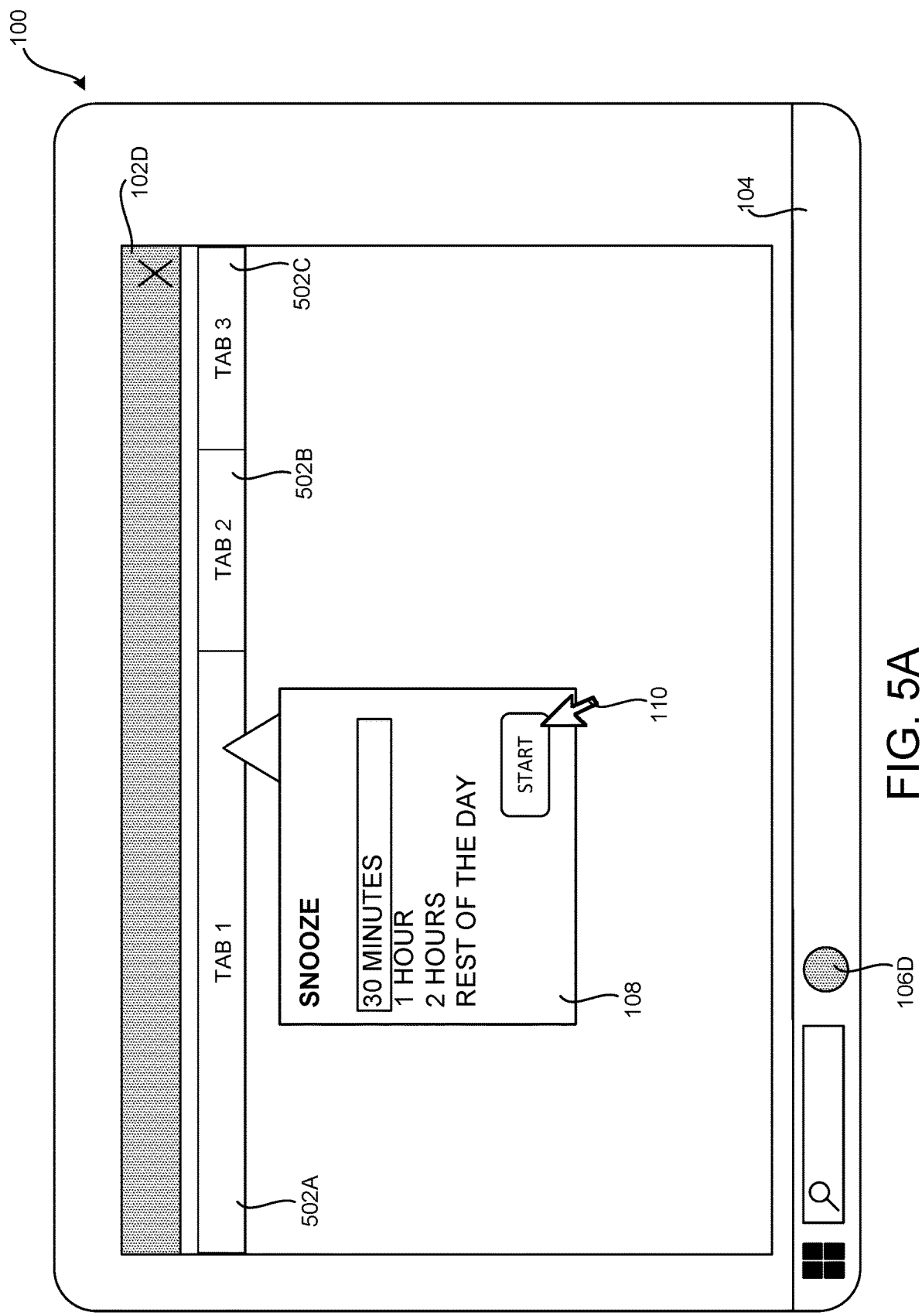

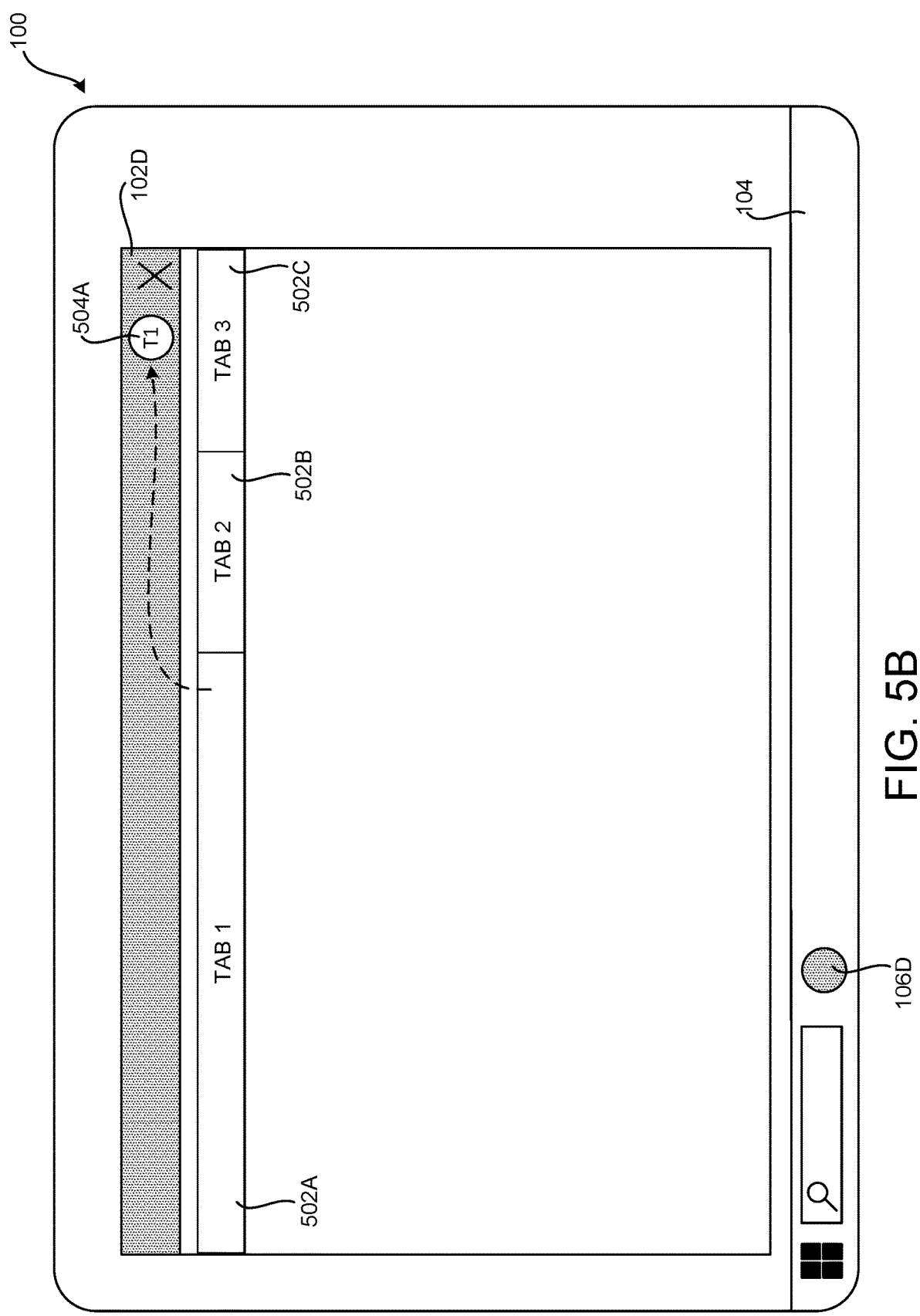

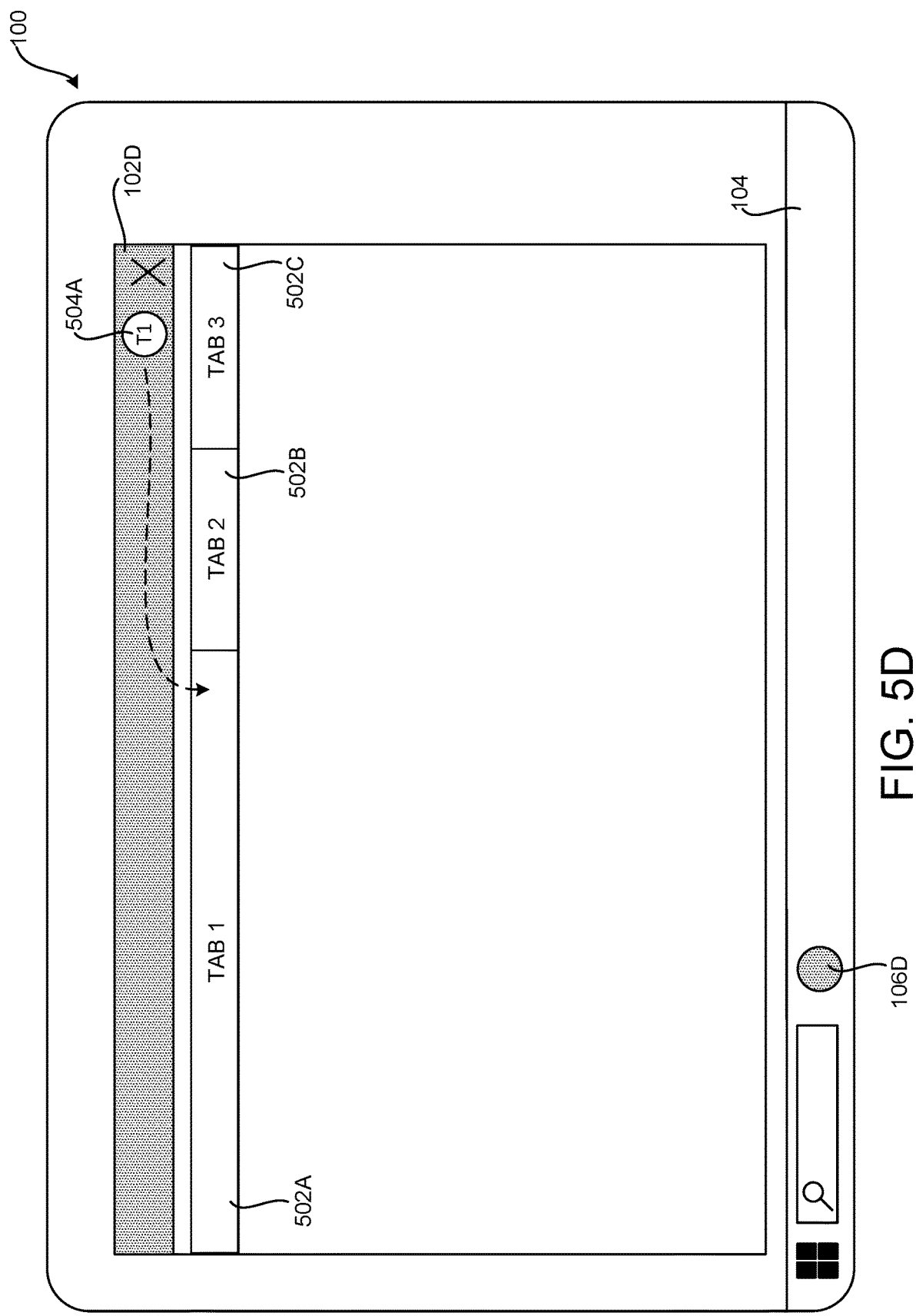

TEMPORARILY HIDING USER INTERFACE ELEMENTS

BACKGROUND

Modern computer users commonly utilize many applications at the same time. For example, it is not uncommon for a computer user to concurrently utilize email and other communications applications, word processing, spreadsheet, and other productivity applications, a web browser application with multiple open tabs, and other applications. Some of the concurrently open applications might be utilized for business purposes while other applications might be utilized for personal tasks. Some applications, like web browser applications, might even be utilized for both business and personal tasks at the same time.

There are scenarios where users would like for certain applications to remain visible and other applications to not be visible. For example, during a video communications session or another type of presentation where a user is required to share a view of their screen with other users, the user might not want certain applications to be shown (e.g. a web browser application open to a social media site). As another example, there are times when a user would like to focus on a specific task, writing a paper for example. In a situation such as this, it is desirable for only the application that the user is focusing on to be displayed.

Users commonly utilize several methods to organize applications such that only desired applications are displayed on screen. One example is through the use of virtual desktops. Virtual desktops allow users to create multiple independent desktops and then separately assign windows to the desktops. The users can then switch between the virtual desktops as needed to access desired applications. Virtual desktops, however, can be confusing and difficult to utilize for some users.

Another mechanism utilized to show only desired application windows is to simply close applications that a user does not want on screen at a given time. This technique, however, requires users to remember to come back at a later time and reload the applications in order to pick up their work where they left off. Users might not remember to do this in certain cases, which could result in a the failure to complete a given task. Moreover, exiting and re-launching applications can take time and might require multiple actions by a user in order to configure application windows in the manner that they were previously configured. This can unnecessarily consume computing resources such as, but not limited to, memory, processing cycles, and network bandwidth.

It is with respect to these and other technical challenges that the disclosure made herein is presented.

SUMMARY

Technologies are disclosed herein for temporarily hiding and unhiding UI elements, a process which might be referred to herein as "snoozing" a UI element. Through implementations of the disclosed technologies, user interface ("UP") elements, such as application windows or application tabs, can be temporarily hidden from view for a user-specified period of time. When the user-specified period of time has elapsed, a previously hidden UI element can be returned to view in its previous location without user intervention.

Hiding and automatically unhiding UI elements in the manner described herein can free users from having to utilize complex and computationally intensive mechanisms such as virtual desktops to organize applications, can free users from having to remember to re-launch previously closed applications in order to complete tasks, and can save computing resources by not requiring the closure and re-opening of applications as currently done by many users in order to provide a focused view of their application windows. Other technical benefits not specifically mentioned herein can also be realized through implementations of the disclosed subject matter.

In order to realize the technical benefits mentioned briefly above, a computing device is configured to display UI elements. UI elements can include, but are not limited to, windows displayed by applications (i.e., "application windows") and windows displayed by an operating system (i.e., "operating system windows"). UI elements can also include tabs displayed by applications configured to provide a tabbed document interface ("TDI"). A TDI allows multiple panels, commonly referred to as "tabs" or "application tabs", to be displayed within a single window. Although the examples presented herein are primarily discussed in the context of application windows and tabs, it is to be appreciated that the disclosed technologies can be utilized with other types of UI elements in other configurations.

When a UI element is displayed, such as an application window, an identifier corresponding to the UI element might be displayed in a first area of a taskbar provided by an operating system. For instance, in the case of an application window, an icon might be displayed in a first area of a taskbar that corresponds to the application displaying the application window. As will be described in greater detail below, the first area of the taskbar is an area of the taskbar that is reserved for identifiers corresponding to non-hidden UI elements.

A taskbar is an area of a desktop provided by an operating system that is utilized for displaying identifiers (e.g., icons) for executing and non-executing applications. A taskbar can provide other types of functionality, such as functionality for launching applications, searching, and others. Examples of taskbars include, but are not limited to, the taskbar provided by the WINDOWS operating system from MICROSOFT CORPORATION and the dock provided by the MACOS operating system from APPLE INC. Taskbars are also commonly present in other operating systems from other vendors.

In order to initiate the temporary hiding of a UI element, a user might select the identifier corresponding to the UI element in the taskbar. In the case of an application window, for instance, a user might select the identifier corresponding to the application displaying the application window. In response thereto, a UI control can be presented with options for temporarily hiding the corresponding application window. The options can include, for example, elements for selecting an amount of time (e.g., 30 minutes, one hour, all day) the application window is to be hidden or selecting a particular time at which the application window is to be unhidden. Through the selection of one of these options, a user can specify an amount of time to temporarily hide the application window (or other type of UI element).

In some embodiments, other options can also be provided that define the manner in which the UI element is to be temporarily hidden. For example, and without limitation, a user might specify that a UI element is to be hidden on a virtual desktop, that notifications for a hidden UI element are to be disabled while the UI element is hidden, or that the application displaying the UI element is configured for reduced utilization of computing resources while the UI element is hidden. Other options might include the ability to temporarily hide all UI elements other than a selected UI element or that all UI elements be hidden temporarily.

In some embodiments, selection of a UI element itself might cause a UI control to be presented with options for defining the manner in which the UI element is to be temporarily hidden. For example, a selection of a title bar or another portion of an application window might cause such a UI control to be presented. In another embodiment, a selection in a taskbar might cause a UI control to be presented with options for defining the manner in which a UI element is to be temporarily hidden. In yet another embodiment, a UI element might be selected and "dragged" to a predefined location for initiating the temporary hiding of the UI element. Additional details regarding the various ways in which temporary hiding of a UI element can be initiated and the various options that might be specified for temporary hiding of a UI element will be provided below with regard to FIGS. 1A-1E.

When the temporary hiding of a UI element is initiated using one of the mechanisms described above, the specified UI element is hidden. For example, a display of a UI element might be removed or, if requested, the UI element might be moved to a virtual desktop. Additionally, the identifier corresponding to the UI element in the taskbar might be moved from the first area of the taskbar to a second area of the taskbar. The second area of the taskbar is an area reserved for identifiers corresponding to hidden UI elements. Additionally, in some embodiments, an animation might be provided that shows the identifier moving from the first area of the taskbar to the second area of the taskbar. An animation can also be provided in some embodiments showing the UI element moving to the identifier in the second area of the taskbar. In other embodiments, no identifier corresponding to a hidden UI element is displayed.

In order to un-hide a temporarily hidden UI element, a determination can be made as to whether the specified period of time to hide the UI element has elapsed. If the period of time has elapsed, the UI element is displayed in its original position. Additionally, the identifier corresponding to the previously hidden UI element is moved from the second area of the taskbar to the first area of the taskbar in some embodiments. As in the example above, an animation might be provided showing the movement of the identifier or the UI element.

In some embodiments, a UI control is provided that enables a user to un-hide a UI element prior to the specified period of time elapsing. For instance, in one embodiment a user can select an identifier corresponding to a hidden UI element in the taskbar. In response thereto, a UI control is presented through which a user can manually request to unhide the corresponding UI element. In response to receiving a request thereby to manually unhide a UI element, the UI element is displayed even though the originally specified period of time for hiding the UI element has not yet elapsed.

In some embodiments, functionality is provided for enabling a user to extend the period of time that a UI element is to be hidden prior to expiration of the originally specified period of time to hide the UI element. For example, and without limitation, a UI control might be displayed prior to the specified period of time to hide a UI element elapsing that allows a user to extend the time that the UI element will be hidden. In response to receiving a request through such a UI control, the UI element will be hidden for an additional period of time specified by a user.

As discussed briefly above, the embodiments disclosed herein can be utilized in conjunction with various types of UI elements, including tabs displayed by applications configured to provide a TDI. As mentioned above, a TDI allows multiple panels, commonly referred to as "tabs", to be displayed within a single window. In these embodiments, an application window can be displayed that includes one or more tabs.

In a manner similar to the examples given above, a request can be received to temporarily hide one of the tabs that specifies a period of time during which the tab is to be hidden. For example, a UI control might be displayed in response to a selection of one of the tabs that provides options for specifying the length of time the tab is to be hidden and potentially others.

In response to receiving a request to hide a tab, the display of the tab is hidden. Additionally, as in the examples given above, notifications provided by the tab might be disabled and the tab might be configured for reduced utilization of computing resources, depending upon the particular options selected by the user.

A determination might also be made as to whether the specified period of time to hide a tab has elapsed. If the period of time has elapsed, the tab is re-displayed. As in the example above, a UI control might also be presented prior to the period of time elapsing that allows a user to extend the period of time that the tab is hidden. Additional options can be provided in other embodiments.

As discussed briefly above, implementations of the technologies disclosed herein provide various technical benefits such as, but not limited to, freeing users from having to utilize virtual desktops to organize applications, freeing users from having to remember to re-launch previously closed applications in order to complete tasks and saving computing resources by not requiring the closure and re-opening of applications in order to provide a focused view of applications. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a user interface diagram that shows aspects of an illustrative user interface for manually requesting that a temporarily hidden UI element that is about to be unhidden be hidden for a further period of time, according to one embodiment disclosed herein;

FIG. 5A is a user interface diagram that shows aspects of one illustrative user interface for initiating the temporary hiding of a UI tab provided by an application that supports a tabbed UI, according to one embodiment disclosed herein;

FIG. 5B is a user interface diagram that shows additional aspects of the illustrative user interface shown in FIG. 5A for initiating the temporary hiding of a UI tab provided by an application that supports a tabbed UI, according to one embodiment disclosed herein;

FIG. 5D is a user interface diagram that shows additional aspects of the illustrative user interface shown in FIGS. 5A and 5B for initiating the temporary hiding of a UI tab provided by an application that supports a tabbed UI, according to one embodiment disclosed herein;

DETAILED DESCRIPTION

Figure 1A:
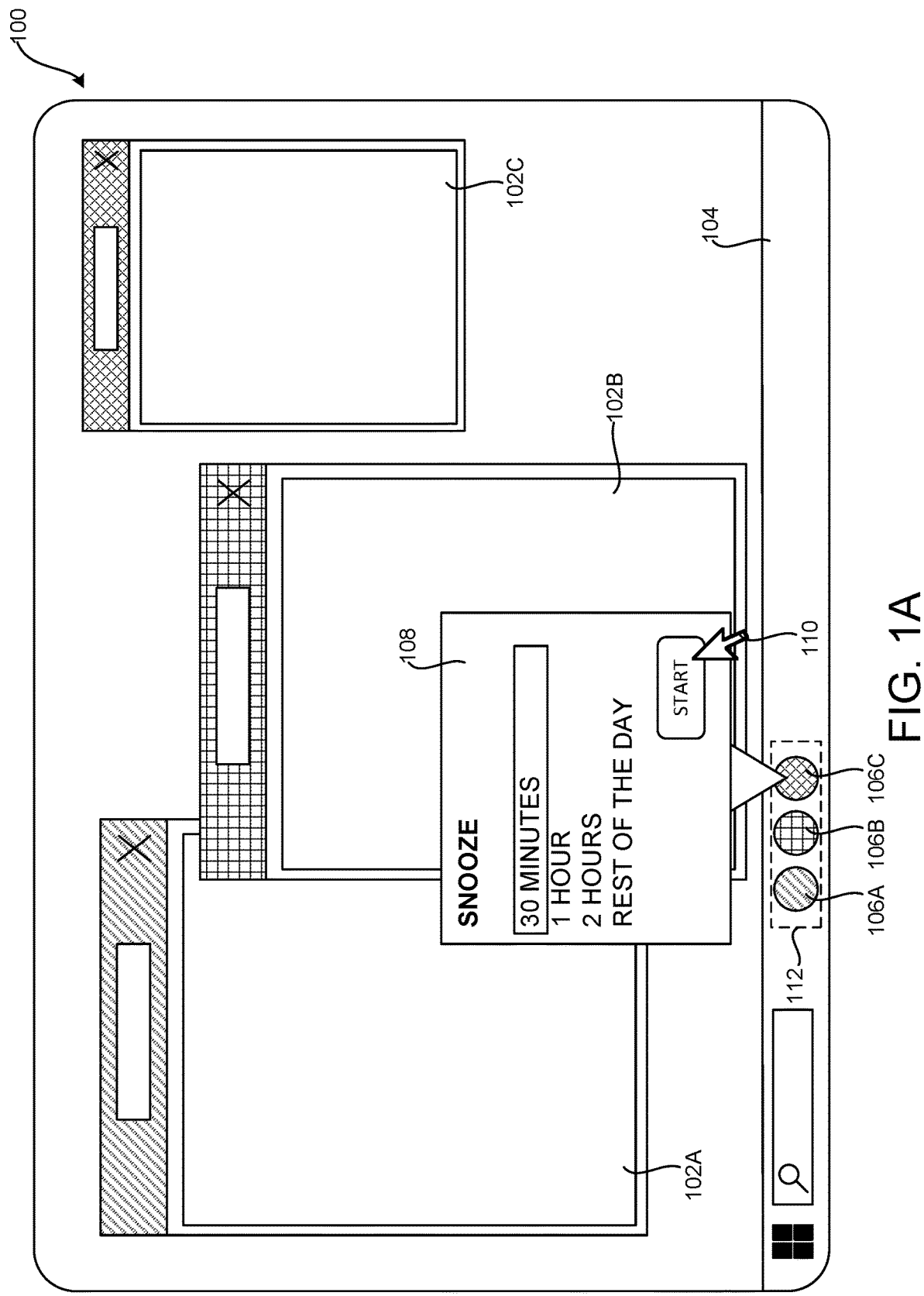
FIG. 1A is a user interface diagram that shows aspects of one illustrative user interface for initiating the temporary hiding of a UI element, according to one embodiment disclosed herein.

The following detailed description is directed to technologies for temporarily hiding UI elements. As discussed briefly above, various technical benefits can be realized through implementations of the disclosed technologies such as, but not limited to, freeing users from having to utilize virtual desktops to organize applications, freeing users from having to remember to re-launch previously closed applications in order to complete tasks, and saving computing resources by not requiring the closure and re-opening of applications in order to provide a focused view of applications. Other technical benefits not specifically mentioned herein can also be realized through implementations of the disclosed subject matter.

While the subject matter described herein is presented in the general context of a desktop, laptop, smartphone, or tablet computing device configured for temporarily hiding and unhiding UI elements, those skilled in the art will recognize that other implementations can be performed in combination with other types of computing devices, systems, and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for temporarily hiding and unhiding UI elements will be described.

FIG. 1A is a user interface diagram showing aspects of one illustrative user interface for initiating the temporary hiding of a UI element, according to one embodiment disclosed herein. In particular, FIG. 1A shows a UI 100 that includes UI elements displayed by several applications and an operating system executing on a computing device such as that described below with regard to FIG. 8. As discussed briefly above, UI elements can include, but are not limited to, windows displayed by applications (i.e., "application windows") and windows displayed by an operating system (i.e., "operating system windows").

UI elements can also include tabs displayed by applications configured to provide a tabbed document interface ("TDI"). As mentioned above, a TDI allows multiple panels, commonly referred to as "tabs" or "application tabs", to be displayed within a single window. In this regard, it is to be appreciated that although the examples presented herein with regard to FIGS. 1A-4 are primarily described in the context of application windows 102 and the examples presented herein with regard to FIGS. 5A-5D are primarily described in the context of tabs 502, it is to be appreciated that the disclosed technologies can be utilized with other types of UI elements in other configurations.

In the example shown in FIG. 1A, three application windows 102A-102C are displayed. When a UI element is displayed, such as an application window 102, an identifier corresponding to the UI element might be displayed in a first area of a taskbar 104 provided by an operating system. For instance, in the case of an application window 102, an icon 106 might be displayed in a first area 112 of the taskbar 104 that corresponds to the application displaying the application window 102.

In the example shown in FIG. 1A, for instance, an icon 106A has been displayed in the area 112 of the taskbar 104 that is associated with the application window 102A, an icon 106B has been displayed in the area 112 of the taskbar 104 that is associated with the application window 102B, and an icon 106C has been displayed in the area 112 of the taskbar 104 that is associated with the application window 102C. As will be described in greater detail below, the first area 112 of the taskbar 104 is an area of the taskbar 104 that is reserved for identifiers (e.g., the icons 106) corresponding to non-hidden UI elements, such as the application windows 102A-102C.

As mentioned briefly above, a taskbar 104 is an area of a desktop provided by an operating system that is utilized for displaying identifiers (e.g., the icons 106) associated with executing and non-executing applications. A taskbar 104 can provide other types of functionality, such as functionality for launching applications, searching, and others. The taskbar 104 is shown at the bottom of the desktop in the illustrated embodiment, but might be presented in other locations (e.g., the left, right, or top of the desktop) in other embodiments. Examples of taskbars 104 include, but are not limited to, the taskbar provided by the WINDOWS operating system from MICROSOFT CORPORATION and the dock provided by the MACOS operating system from APPLE INC. Taskbars are also commonly present in other operating systems from other vendors.

In order to initiate the temporary hiding of a UI element, a user might select the identifier corresponding to the UI element in the taskbar 104. In the case of an application window 102C, for instance, a user might select the icon 106C corresponding to the application displaying the application window 102C. For instance, in the example shown in FIG. 1A, a user has selected the icon 106C using an appropriate user input device (i.e., a mouse cursor 110 in the illustrated example). In this regard, it is to be appreciated that while the examples illustrated herein are primarily discussed in the context of utilizing a pointing device and a mouse cursor 110 to make UI selections, other mechanisms such as voice input and touch screen user interfaces can be utilized in a similar fashion. Accordingly, the embodiments disclosed herein should not be limited to any particular user input device for making selections.

In response to the selection of an identifier in the taskbar 104, such as the icon 106C in the illustrated example, a UI control 108 can be presented with user-selectable options for temporarily hiding the corresponding UI element (e.g., the application window 102C in the illustrated example). The options can include, for example, elements for selecting the amount of time (e.g., 30 minutes, one hour, two hours, or the rest of the day) that the UI element is to be hidden or specifying a time at which the UI element is to be unhidden. Through the selection of one of these options, a user can thereby specify an amount of time to temporarily hide a UI element.

In the illustrated example, a user has selected an option for temporarily hiding the application window 102C for 30 minutes. Selection of the start button shown in the UI control 108 using the mouse cursor 110 will cause the application window 102C to be temporarily hidden in the manner described below. It is to be appreciated that the UI control 108 shown in FIG. 1A is merely illustrative and that other options relating to the manner in which a UI element is hidden can also be provided in the UI control 108, some of which are described below with regard to FIG. 1E.

Figure 1B:
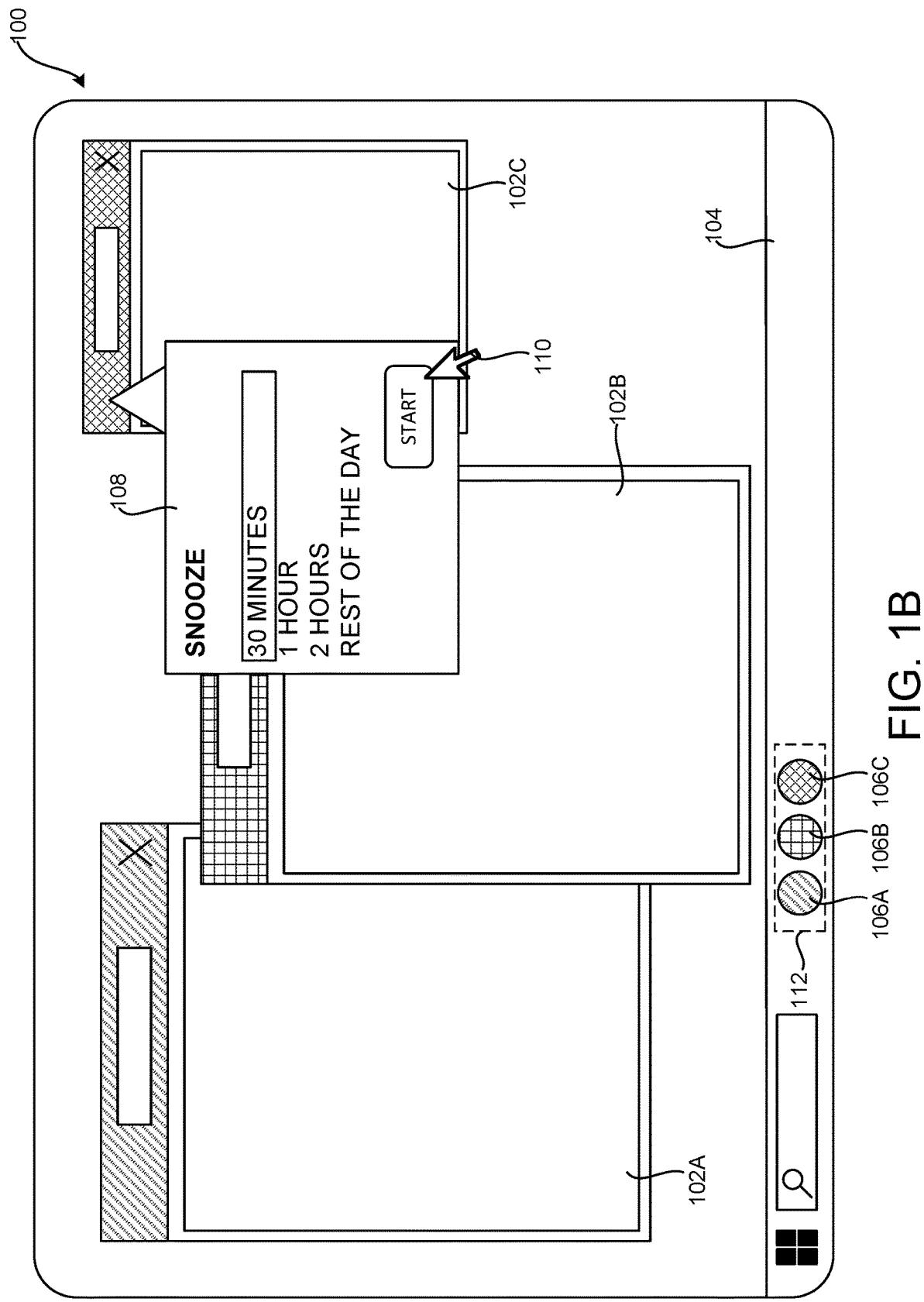
FIG. 1B is a user interface diagram that shows aspects of another illustrative user interface for initiating the temporary hiding of a UI element, according to one embodiment disclosed herein.

FIG. 1B is a user interface diagram that shows aspects of another illustrative user interface for initiating the temporary hiding of a UI element, according to one embodiment disclosed herein. As shown in FIG. 1B, in some embodiments the selection of a UI element itself might cause a UI control 108 to be presented with options for defining the manner in which the UI element is to be temporarily hidden. For instance, in the example illustrated in FIG. 1B, the selection of a title bar or another portion of an application window 102C (e.g., using a "right-click" selection) has caused the UI control 108 to be presented adjacent to the application window. As in the example described above, the UI control 108 presented adjacent to the application window 102C contains user-selectable options for defining the length of time that the application window 102C is to be temporarily hidden. As will be described in greater detail below, the UI control 108 can include other options in other embodiments.

Figure 1C:
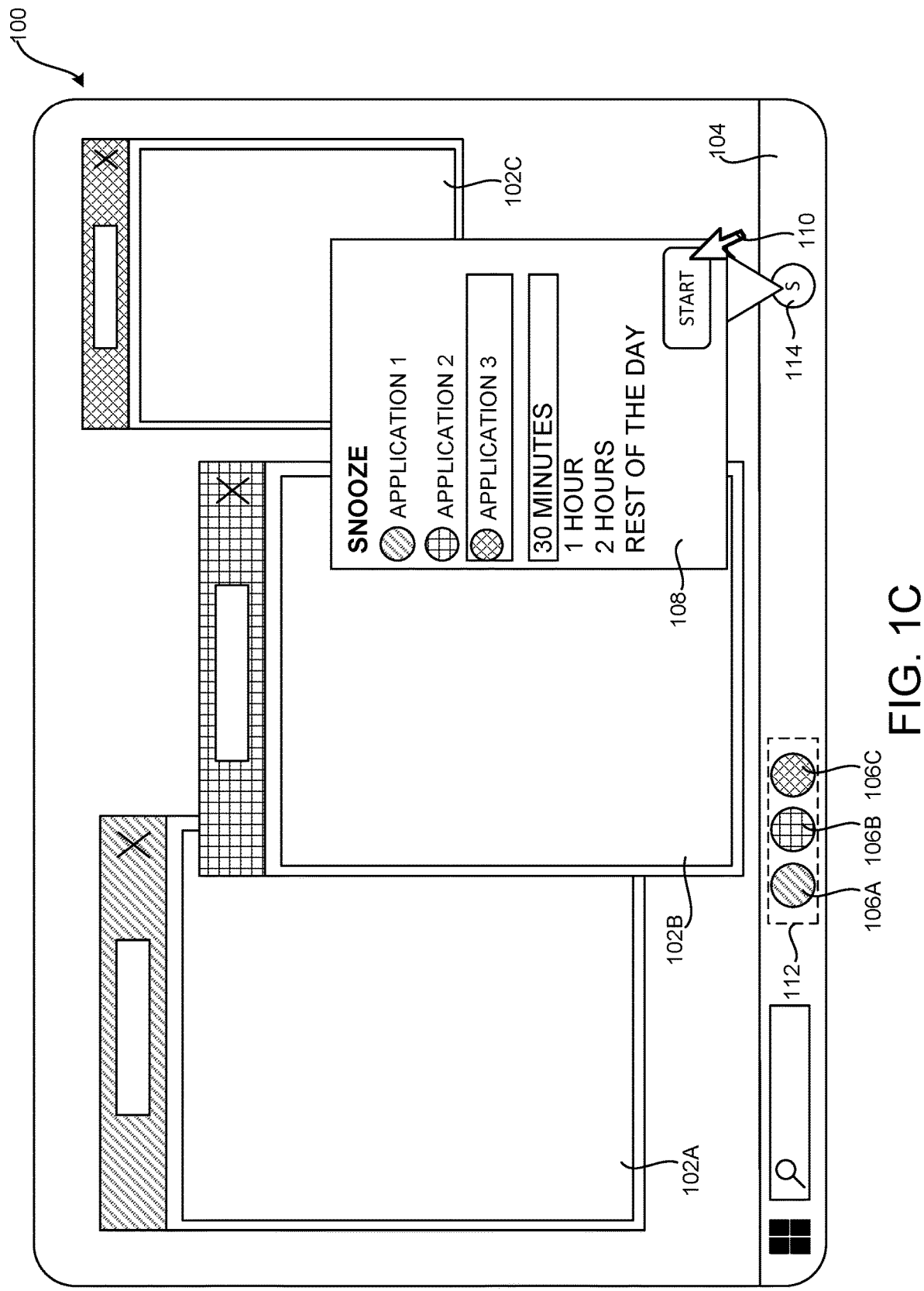
FIG. 1C is a user interface diagram that shows aspects of yet another illustrative user interface for initiating the temporary hiding of a UI element, according to one embodiment disclosed herein.

FIG. 1C is a user interface diagram that shows aspects of another illustrative user interface for initiating the temporary hiding of a UI element, according to one embodiment disclosed herein. In the example illustrated in FIG. 1C, a selection in the taskbar 104 causes the UI control 108 to be presented with options for defining the manner in which a UI element is to be temporarily hidden. In particular, in this embodiment, an icon 114 is presented in the taskbar 104.

In response to the selection of the icon 114 using the mouse cursor 110 or another mechanism, the UI control 108 is displayed. In this regard, it is to be appreciated that other types of selections in the taskbar 104 might cause the presentation of the UI control 108 shown in FIG. 1C. For instance, a user might perform a right-click selection action on the taskbar 104 in order to have the UI control 108 or a similar presented. Other mechanisms can be used in other embodiments.

As in the previous examples, the UI control 108 shown in FIG. 1C includes selectable options for specifying the amount of time that an application window 102 is to be hidden. In this example, however, the UI control 108 also includes user-selectable options for specifying the particular application window 102 that is to be hidden. For instance, in the example shown in FIG. 1C, the user has indicated that the application window 102C associated with "Application 3" is to be hidden for 30 minutes. In this manner, the UI control 108 can be utilized to select the UI element that is to be temporarily hidden and the amount of time that the selected UI element is to be hidden for.

Figure 1D:
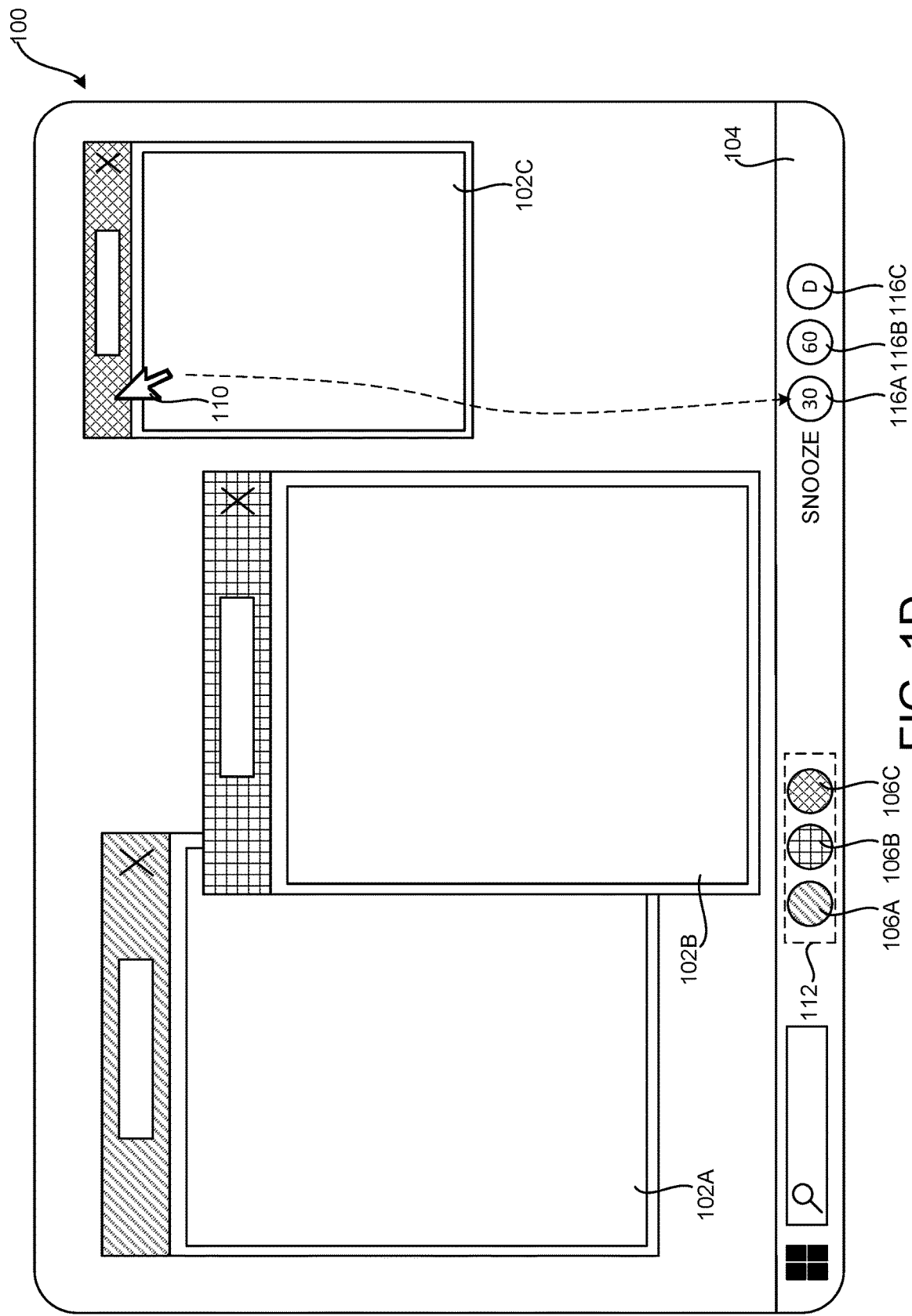
FIG. 1D is a user interface diagram that shows aspects of an additional illustrative user interface for initiating the temporary hiding of a UI element, according to one embodiment disclosed herein.

FIG. 1D is a user interface diagram that shows aspects of an additional illustrative user interface for initiating the temporary hiding of a UI element, according to one embodiment disclosed herein. In particular, in this embodiment a UI element can be selected and "dragged" to a predefined location in the taskbar 104, or elsewhere, for initiating the temporary hiding of the UI element.

In the example shown in FIG. 1D, for instance, a user has selected the application window 102C utilizing the mouse cursor 110 and dragged the window 102C to an icon 116A in the taskbar 104. In this example, each of the icons 116 corresponds to a different amount of time for hiding a UI element (i.e., dragging to the icon 116A will cause a UI element to be hidden for 30 minutes, dragging to the icon 116B will cause a UI element to be hidden for 60 minutes, and dragging to the icon 116C will cause a UI element to be hidden for the remainder of the day).

In the example shown in FIG. 1D, the user's action will cause the application window 102C to be temporarily hidden for 30 minutes. As mentioned above, dragging the application window 102C to the icon 116B would cause the application window 102C to be hidden for 60 minutes and dragging the application window 102C to the icon 116C would cause the application window 102C to be hidden for the remainder of the day. In other embodiments, a UI element might be dragged in a similar fashion to a different location (e.g. a different location on the taskbar 104 or a pre-defined corner of the operating system desktop) in order to initiate temporary hiding of the UI element for a predetermined period of time. In yet another embodiment, a user might select multiple application windows at once and perform one of the operation described herein to snooze the selected group of application windows.

Figure 1E:
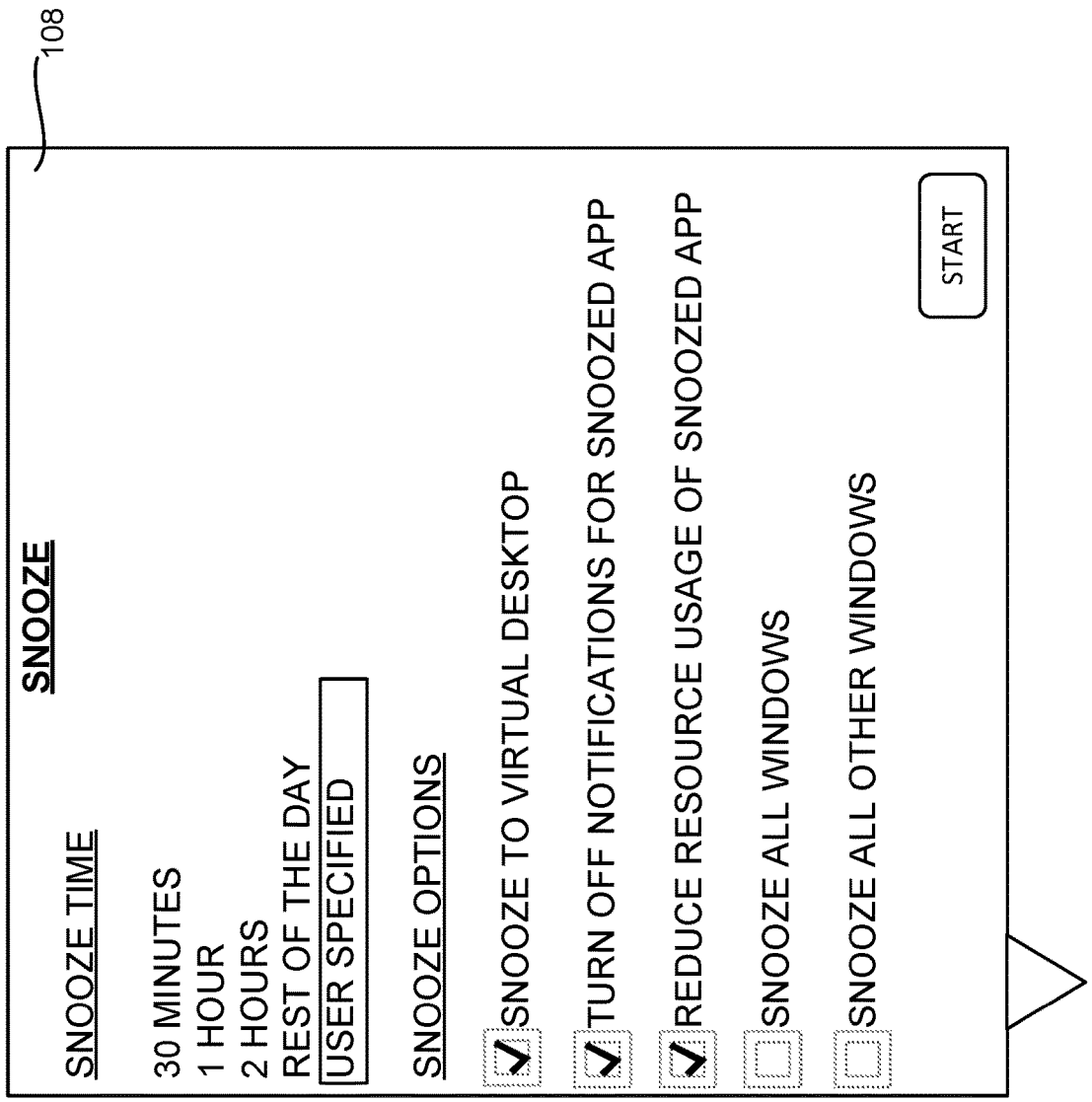
FIG. 1E is a user interface diagram that shows an illustrative configuration for a user interface for specifying options defining aspects of the manner in which a UI element is to be temporarily hidden, according to one embodiment disclosed herein.

FIG. 1E is a user interface diagram that shows an illustrative configuration for a UI control 108 for specifying additional options defining aspects of the manner in which a UI element is to be temporarily hidden, according to one embodiment disclosed herein. As discussed above, the UI control 108 can be utilized to specify the amount of time that a UI element is to be hidden for and, in some embodiments such as that shown in FIG. 1C, to specify the particular UI element that is to be hidden.

In some embodiments, the UI control 108 can provide other user-selectable options for defining additional aspects of the manner in which a UI element is to be temporarily hidden. For example, and without limitation, the UI control 108 might enable a user to manually specify a period of time that a UI element is hidden or might enable a user to specify a schedule for hiding UI elements (e.g., to hide UI elements on particular days of the week or particular times on specified days).

In other examples, the UI control 108 might provide options through which a user could specify that a UI element is to be hidden by moving the UI element to a virtual desktop, that notifications generated by a hidden UI element are to be disabled while the UI element is hidden, and/or that the application displaying the UI element is configured for reduced utilization of computing resources while the UI element is hidden (e.g., by reducing the processor cycles allocated to the hidden UI element or through another mechanism).

Other options provided by the UI control 108 might include the ability to temporarily hide all UI elements other than a selected UI element or to hide all presently visible UI elements temporarily. The UI control 108 can provide additional or alternate options for defining the manner in which a UI element is to be hidden in other embodiments.

Figure 2A:
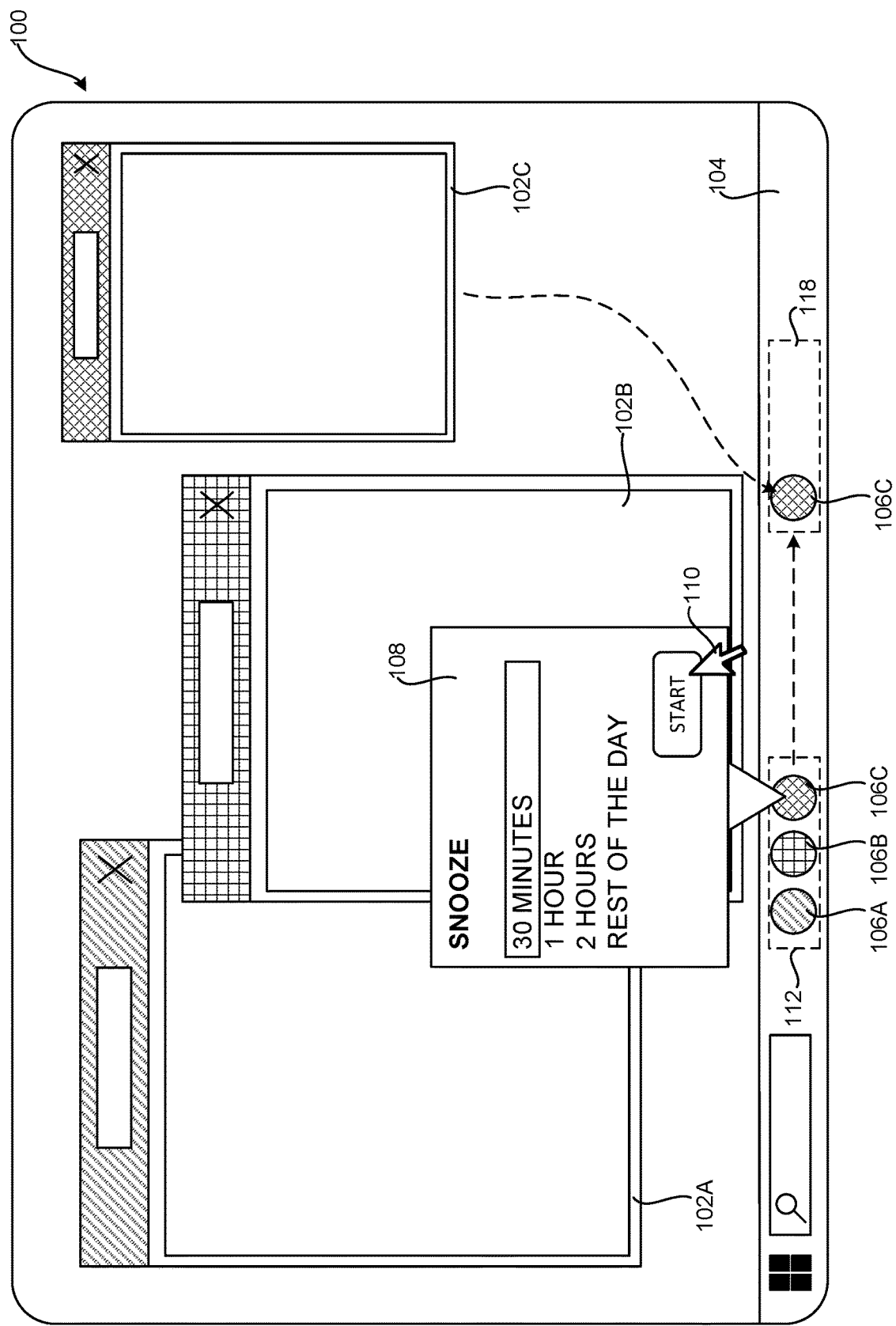
FIG. 2A is a user interface diagram that shows aspects of an illustrative user interface for temporarily hiding a UI element and for visually indicating that the UI element has been hidden, according to one embodiment disclosed herein.
Figure 2B:
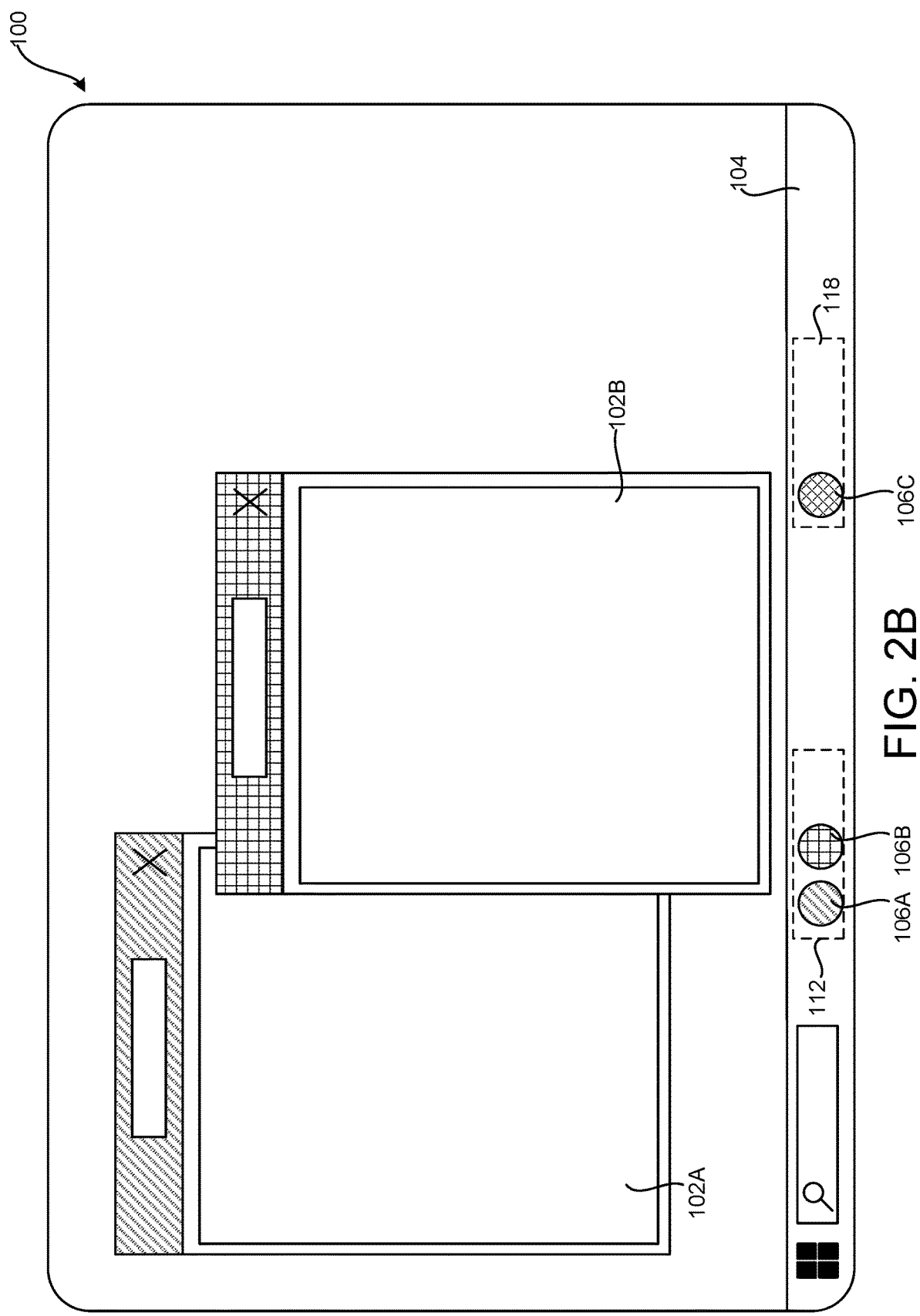
FIG. 2B is a user interface diagram that shows additional aspects of the illustrative user interface shown in FIG. 2A for temporarily hiding a UI element and for visually indicating that the UI element has been hidden, according to one embodiment disclosed herein.

FIGS. 2A and 2B are user interface diagrams that show aspects of an illustrative user interface for temporarily hiding a UI element and for visually indicating that the UI element has been hidden, according to one embodiment disclosed herein. As discussed briefly above, when the temporary hiding of a UI element is initiated using one of the mechanisms described above with respect to FIGS. 1A-1D, the specified UI element is hidden. For example, a display of a UI element might be removed or, if requested, the UI element might be moved to a virtual desktop.

In the example shown in FIGS. 2A and 2B, a user has requested that the application window 102C be temporarily hidden for 30 minutes by selecting the icon 106C and utilizing the UI control 108 in the manner described above with respect to FIG. 1A. In response thereto, the display of the application window 102C has been removed from the UI 100. This is illustrated in FIG. 2B.

Additionally, in the example shown in FIGS. 2A and 2B, the identifier corresponding to the hidden UI element in the taskbar 104 is moved from the first area 112 of the taskbar 104 to a second area 118 of the taskbar 104. In particular, the icon 106C has been moved from the first area 112 of the taskbar 104 to the second area 118 of the taskbar 104. The second area 118 of the taskbar 104 is an area of the taskbar 104 that is reserved for identifiers corresponding to hidden UI elements, such as the application window 102C in the illustrated example. This enables a user to quickly identify those UI elements that have been hidden and, as will be described in greater detail below, to manually unhide UI elements if desired.

An animation can also be provided in some embodiments showing the UI element moving to the identifier in the second area of the taskbar. For example, the dashed line in FIG. 2A between the application window 102C and the icon 106C illustrates the path of such an animation. Similarly, an animation might be provided that shows the identifier corresponding to the hidden UI element moving from the first area 112 of the taskbar 104 to the second area 118 of the taskbar 104. For example, the dashed line in FIG. 2A between the icon 106C in the first area 112 of the taskbar 104 and the icon 106C in the second area 118 of the taskbar 104 illustrates the path of such an animation. These animations can provide visual clues to a user regarding the manner in which a UI element has been hidden.

Figure 2C:
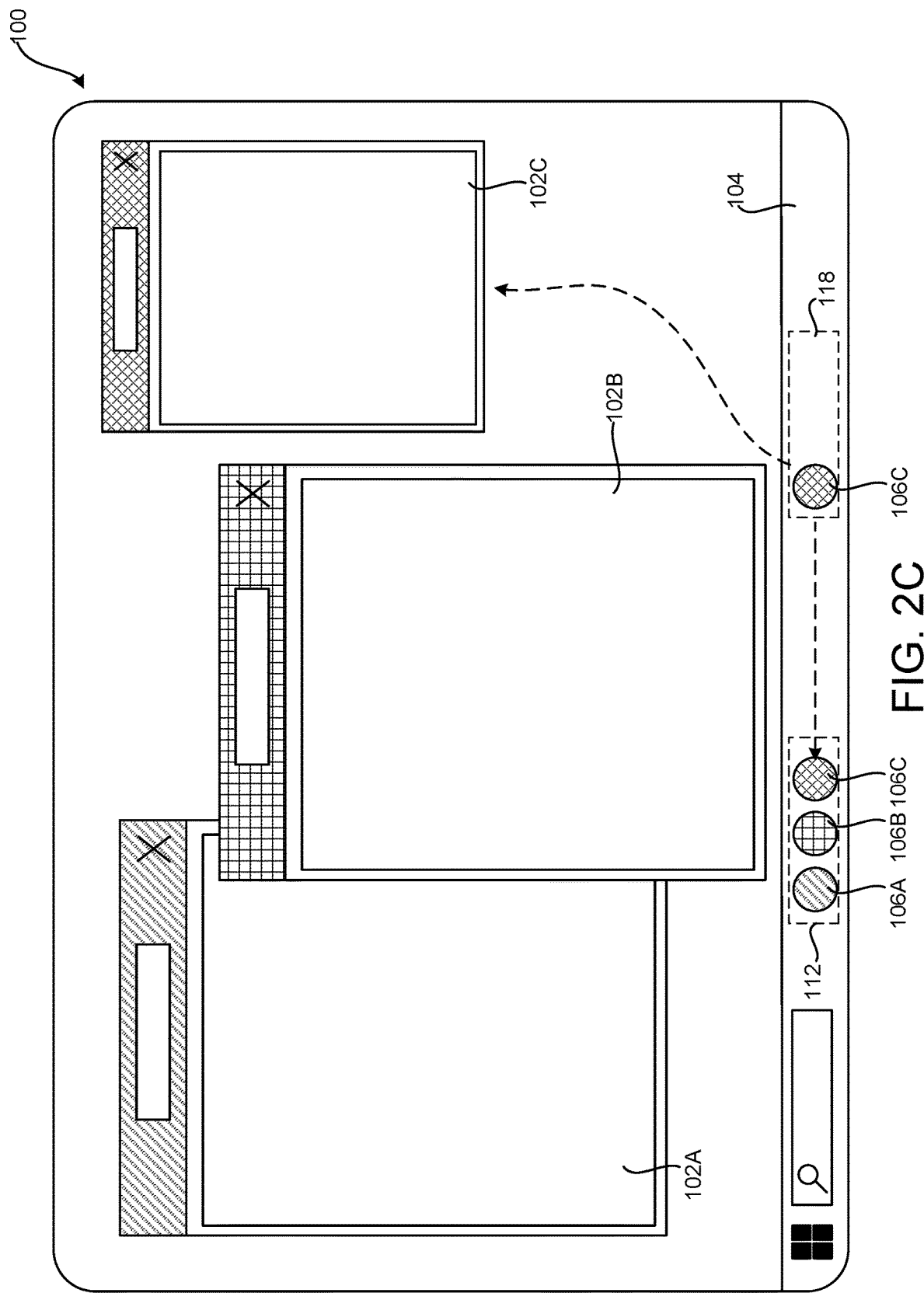
FIG. 2C is a user interface diagram that shows additional aspects of the illustrative user interfaces shown in FIGS. 2A and 2B for unhiding a UI element and for visually indicating that the UI element has been unhidden, according to one embodiment disclosed herein.

FIG. 2C is a user interface diagram that shows additional aspects of the illustrative user interfaces shown in FIGS. 2A and 2B for unhiding a UI element and for visually indicating that the UI element has been unhidden, according to one embodiment disclosed herein. In particular, in order to un-hide a temporarily hidden UI element, a determination can be made as to whether the specified period of time to hide the UI element has elapsed. If the period of time has elapsed, the UI element is re-displayed in its original position.

In the example shown in FIG. 2C, for instance, the application window 102C has been restored to its original position in the UI 100 following the expiration of the specified 30 minutes of time. Additionally, in the illustrated example, the identifier corresponding to the previously hidden UI element is moved from the second area 118 of the taskbar 104 back to the first area 112 of the taskbar 104. In particular, the icon 106C has been moved from the area 118 back to the area 112 of the taskbar 104.

As when a UI element is hidden, an animation can also be provided in some embodiments when a UI element is unhidden. For example, the dashed line in FIG. 2C between the application icon 106C and the application window 102C illustrates the path of such an animation. Similarly, an animation might be provided that shows the identifier corresponding to the hidden UI element moving from the second area 118 of the taskbar 104 back to the first area 112 of the taskbar 104. For example, the dashed line in FIG. 2C between the icon 106C in the second area 118 of the taskbar 104 and the icon 106C in the first area 112 of the taskbar 104 illustrates the path of such an animation. These animations can provide visual clues to a user regarding the manner in which a UI element has been unhidden.

Figure 3A:
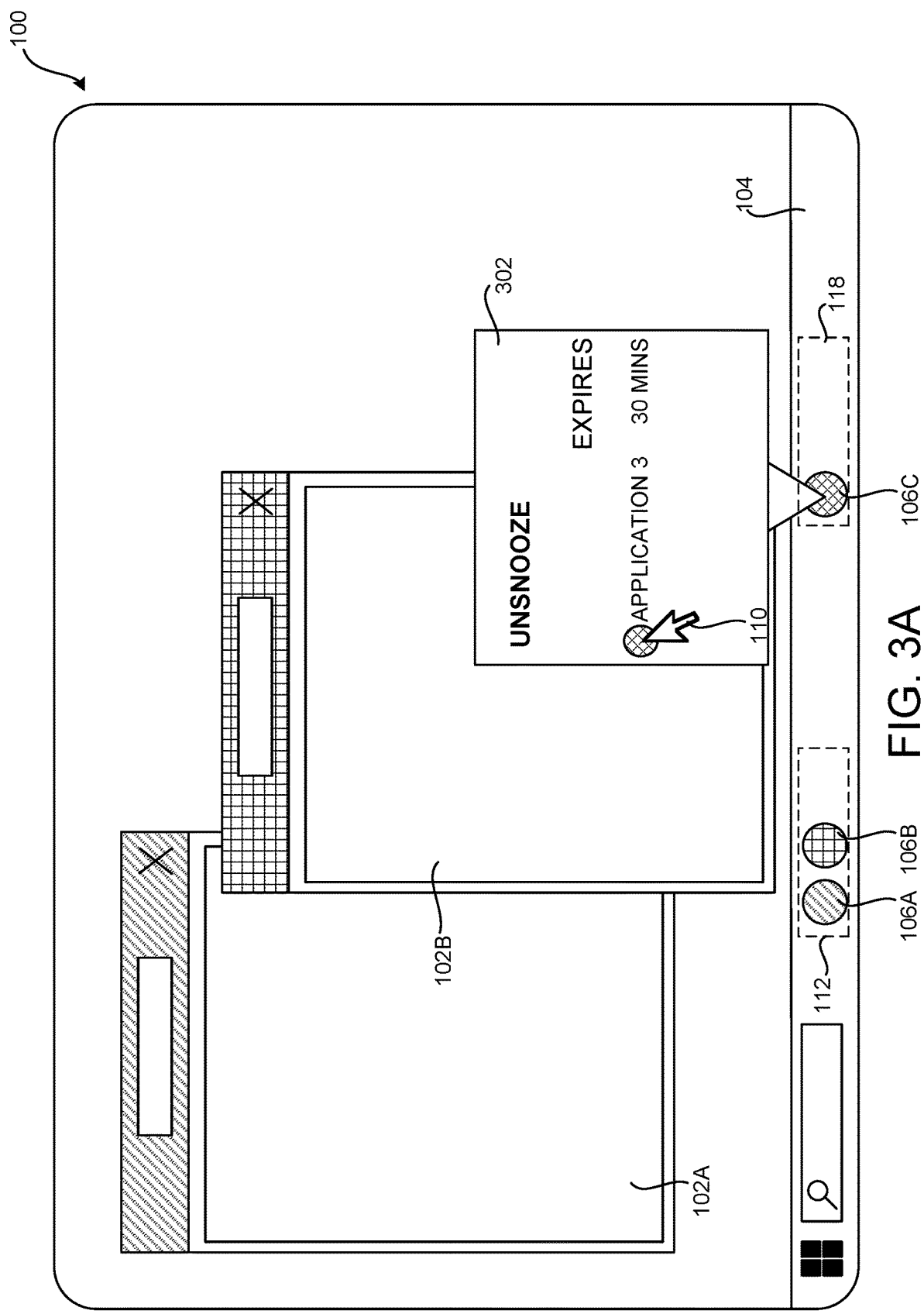
FIG. 3A is a user interface diagram that shows aspects of an illustrative user interface shown for manually requesting that a temporarily hidden UI element be unhidden, according to one embodiment disclosed herein.

FIG. 3A is a user interface diagram that shows aspects of an illustrative user interface for manually requesting that a temporarily hidden UI element be unhidden, according to one embodiment disclosed herein. In particular, in some embodiments, a UI control 302 is provided that enables a user to manually un-hide a UI element prior to the specified period of time elapsing.

For instance, in one embodiment a user can select an identifier corresponding to a hidden UI element in the taskbar 104. For example, in the embodiment shown in FIG. 3A, a user has selected the icon 106C utilizing the mouse cursor 110 and a right-click action. In response thereto, a UI control 302 is presented through which the user can manually request to unhide the corresponding UI element (e.g., the application window 102C in the illustrated example).

Figure 3B:
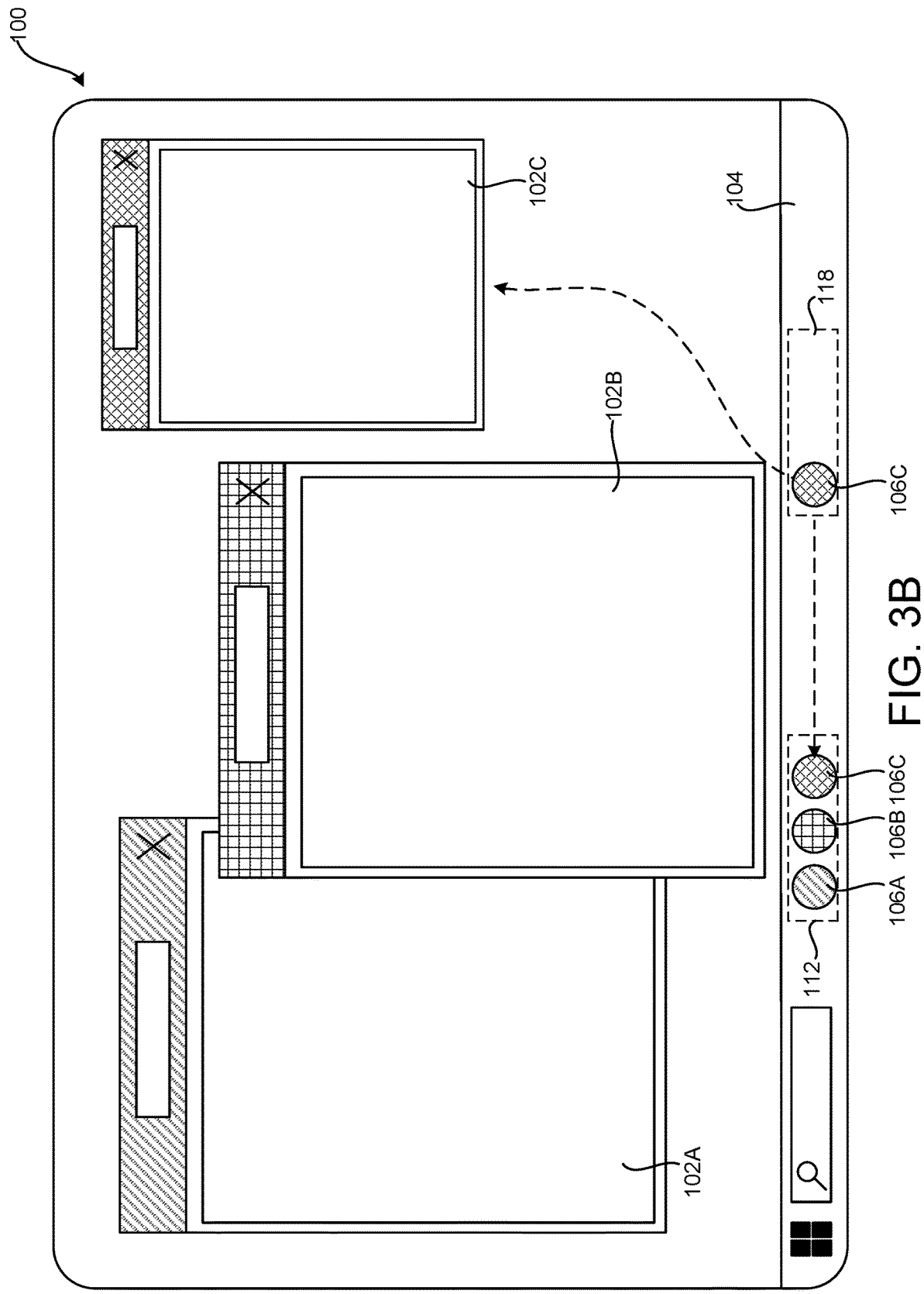
FIG. 3B is a user interface diagram that shows additional aspects of the illustrative user interface shown in FIG. 3A for manually requesting that a temporarily hidden UI element be unhidden and for unhiding the hidden UI element, according to one embodiment disclosed herein.

In response to receiving a request by way of the UI control 302 to manually unhide a UI element, the UI element is unhidden even though the originally specified period of time for hiding the UI element has not yet elapsed. This is illustrated in FIG. 3B. In particular, in the illustrated example a user has selected "Application 3" in the UI control 302 utilizing the mouse cursor 110 in order to request that the application window 102C be unhidden. In response thereto, the application window 102C is displayed. Additionally, one or more animations might be presented in the manner described above in response to a manual request to unhide a temporarily hidden UI element.

FIG. 4 is a user interface diagram that shows aspects of an illustrative user interface for manually requesting that a temporarily hidden UI element that is about to be unhidden be hidden for a further period of time, according to one embodiment disclosed herein. In particular, in some embodiments functionality is provided for enabling a user to extend the period of time that a UI element is to be hidden prior to expiration of the originally specified period of time to hide the UI element.

For example, and without limitation, a UI control 402 might be displayed prior to the end of a specified period of time that a UI element will be unhidden that allows a user to extend the time that the UI element will be hidden. For example, and without limitation, in the example shown in FIG. 4, the application window 102C is scheduled to be unhidden in one minute. In response thereto, a UI control 402 is displayed that indicates to the user that the application window 102C is about to be unhidden and provides user-selectable options for extending the period of time that the application window 102C will be hidden. In some embodiments, a UI control might be provided to enable a user to manually access the UI for manually extending the period of time that the application window 102C will be hidden.

In response to receiving a request through the UI control 402, the UI element (i.e., the application window 102C in the example shown in FIG. 4) will be hidden for an additional period of time specified by a user. The UI control 402 is displayed adjacent to the indicator for the UI element about to be unhidden in the taskbar 104 (i.e., the icon 106C in the illustrated example), but can be displayed in other locations in other embodiments.

In some embodiments, UI elements can be automatically hidden for an additional period of time in response to the occurrence of certain conditions. For example, a user might request that a UI element, such as an application window 102, be hidden for one hour while the user is giving a presentation. If it is detected that the presentation has been extended (e.g., the presentation application is still in use after one hour), the UI element might be automatically hidden for an extended period of time (e.g., 30 minutes). The time that UI elements are temporarily hidden might be automatically extended under other conditions in other embodiments.

As discussed briefly above, the embodiments disclosed herein can be utilized in conjunction with UI elements other than UI windows, including tabs displayed by applications configured to provide a TDI. As described above, a TDI allows multiple panels, commonly referred to as "tabs" or "application tabs", to be displayed within a single window. In these embodiments, an application window can be displayed that includes one or more tabs.

FIG. 5A is a user interface diagram that shows aspects of one illustrative user interface for initiating the temporary hiding of a tab provided by an application that supports a tabbed UI, according to one embodiment disclosed herein. In particular, FIG. 5A shows an application window 102D presented by an application that supports a TDI. Through the TDI, the application has presented three tabs 502A-502C in the application window 102D. An indicator (i.e., an icon 106D) has also been shown in the taskbar 104 for the application presenting the application window 102D.

In a manner similar to the examples given above, a request can be received to temporarily hide one or more of the tabs 502 that specifies a period of time during which the tab 502 is to be hidden. For example, a UI control 108 might be displayed in response to a selection of one or more of the tabs 502 that provides options for specifying the length of time the tab 502, or tabs 502, is to be hidden and potentially other options.

In the example shown in FIG. 5A, for instance, a user has selected the tab 502A utilizing the mouse cursor 110 and, in response thereto, the UI control 108 has been displayed adjacent to the tab 502A. As in the examples above, the UI control 108 includes selectable options for enabling a user to specify the length of time that the selected tab 502A is to be hidden.

Figure 5C:
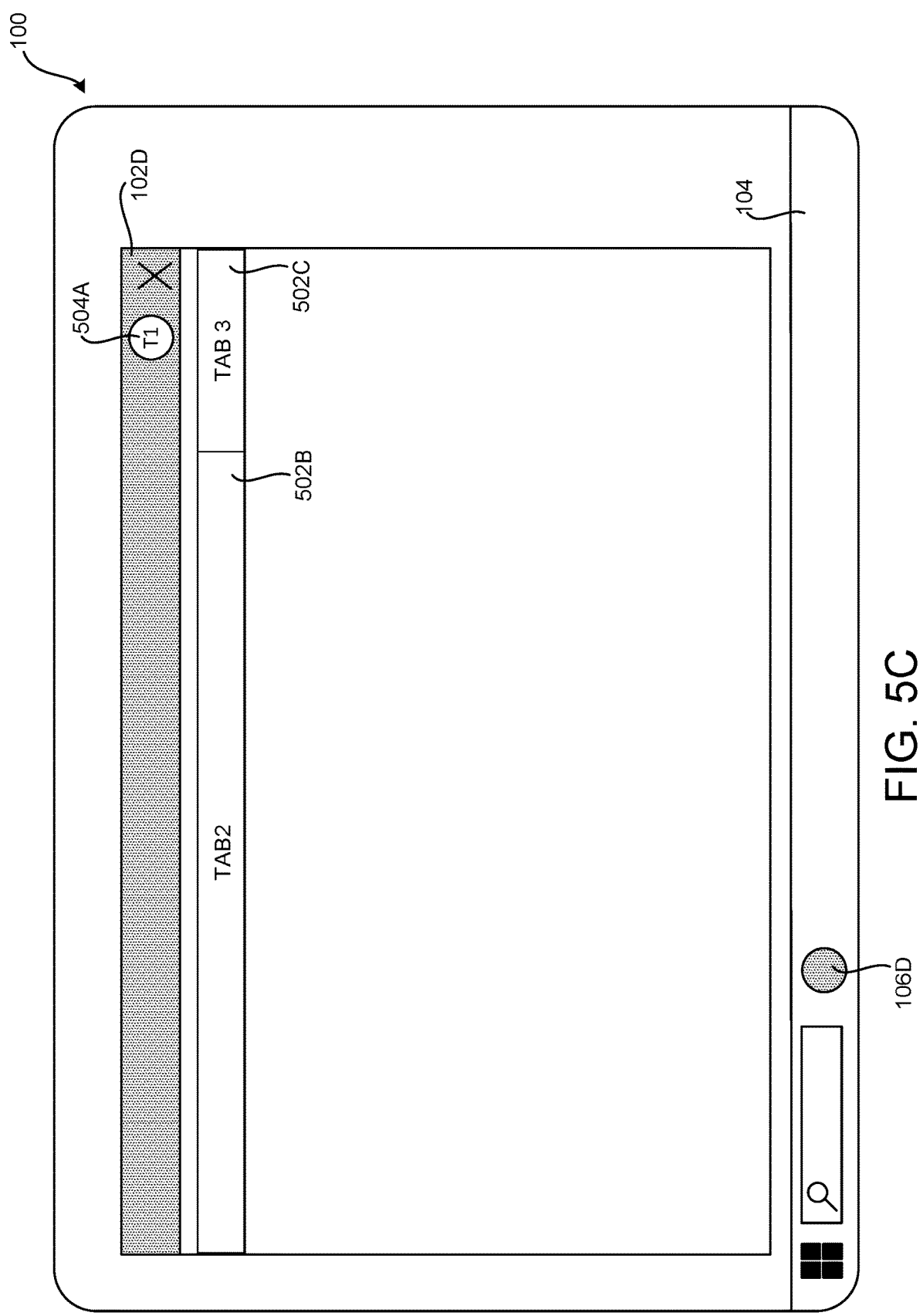
FIG. 5C is a user interface diagram that shows additional aspects of the illustrative user interfaces shown in FIGS. 5A and 5B for unhiding a previously hidden UI tab provided by an application that supports a tabbed UI, according to one embodiment disclosed herein.

In response to receiving a request to hide a tab 502, the display of the tab 502 is hidden. For example, as shown in FIGS. 5B and 5C, the tab 502A can be hidden leaving only the tabs 502B and 502C visible (illustrated in FIG. 5C). Additionally, in some embodiments an indicator can be presented, such as the icon 504A shown in FIGS. 5B and 5C, that represents the hidden tab 502A. An animation might also be presented that shows the tab 502A moving into the indicator. The dashed line in FIG. 5B indicates an animation being displayed that shows the tab 502A moving into the icon 504A in order to indicate that it is being hidden from view.

As in the examples given above, notifications provided by a hidden tab 502 might be disabled and a hidden tab 502 might be configured for reduced utilization of computing resources, depending upon the particular options selected by the user in the UI control 108. In this regard, it is to be appreciated that the other options described above with regard to the UI controls 108, 302, and 402 can also be utilized with tabs 502 or other types of UI elements in other embodiments.

As in the case of a hidden application window 102, a determination might also be made as to whether the specified period of time to hide a tab 502 has elapsed. If the period of time has elapsed, the hidden tab 502 is re-displayed. In the example shown in FIG. 5D, for instance, the tab 502A is re-displayed after the specified period of time has elapsed. Additionally, an animation is presented that shows the tab 502A moving from the icon 504A to its original position in the window 102D. As in the example described above with regard to FIG. 4, a UI control 402 might also be presented prior to the specified period of time elapsing that allows a user to extend the period of time that a tab 502 is hidden. Additional options can be provided in other embodiments.

Figure 6A:
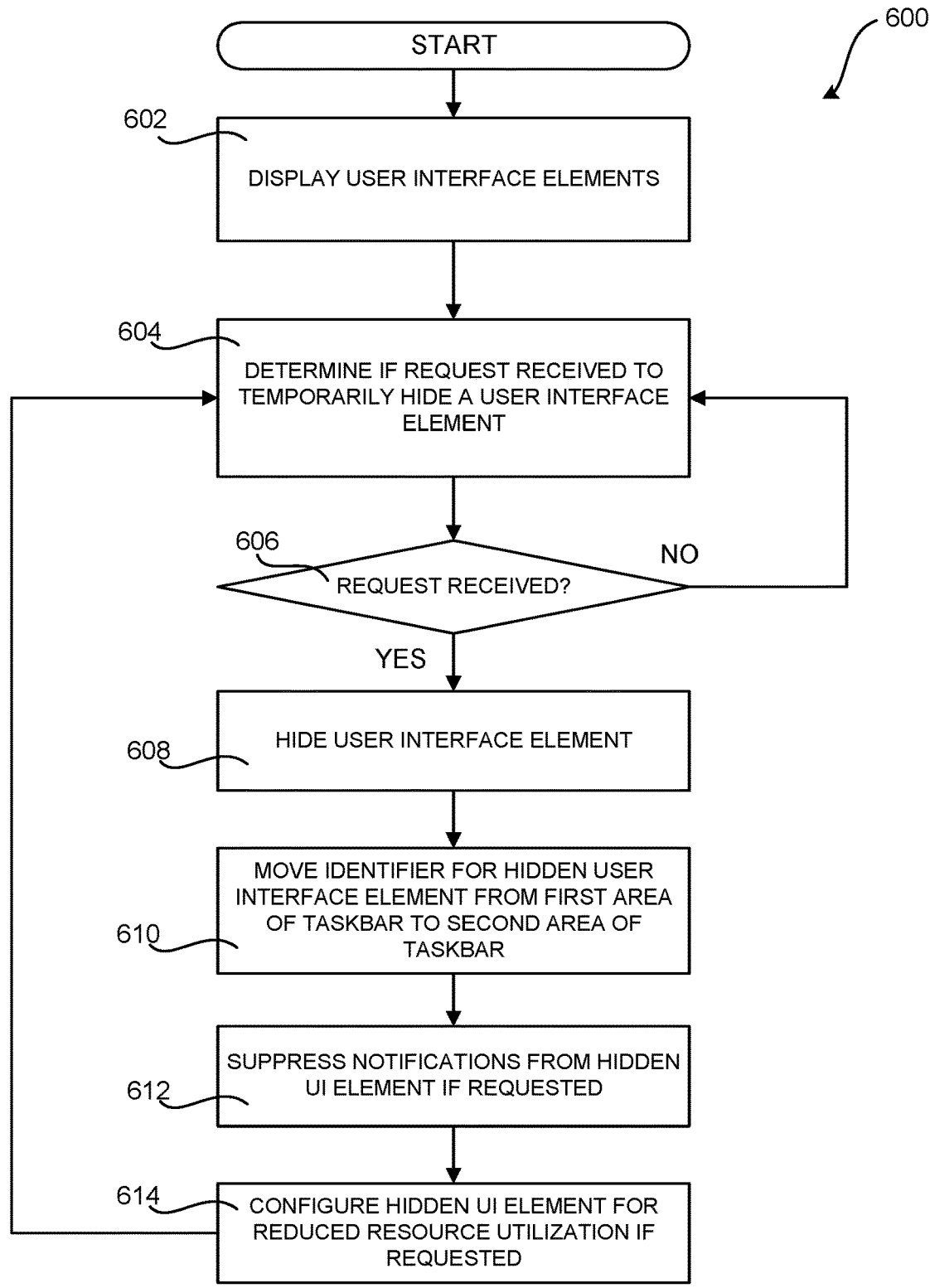
FIG. 6A is a flow diagram showing a routine that illustrates aspects of the operation of the mechanism disclosed herein with reference to FIGS. 1-5A for temporarily hiding UI elements.

FIG. 6A is a flow diagram showing a routine 600 that illustrates aspects of the operation of the mechanism disclosed herein with reference to FIGS. 1-5D for temporarily hiding UI elements. It should be appreciated that the logical operations described herein with regard to FIG. 6A, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 600 begins at operation 602, where one or more UI elements, such as application windows 102 or tabs 502, are displayed. The routine 600 then proceeds from operation 602 to operation 604, where a determination is made as to whether a request has been received to temporarily hide a UI element. For example, such a request might be received by way of the UI control 108 described above. Such a request can be received in other ways in other embodiments.

If a request is received to temporarily hide a UI element, the routine 600 proceeds from operation 606 to operation 608, where the UI element is hidden in the manner described above. The routine 600 then proceeds from operation 608 to operation 610, where the identifier for the hidden UI element may be moved from the first area 112 of the taskbar 104 to the second area 118 of the taskbar 104 in the manner described above.

From operation 610, the routine 600 proceeds to operation 612, where notifications generated by the application associated with the hidden UI element can be suppressed if requested by a user in the manner described above. Similarly, at operation 614, the application associated with the hidden UI element, or the hidden UI element itself, can be configured for reduced utilization of computing resources if requested by the user in the manner described above. From operation 614, the routine 600 proceeds back to operation 604, where another UI element might be temporarily hidden in a similar fashion.

Figure 6B:
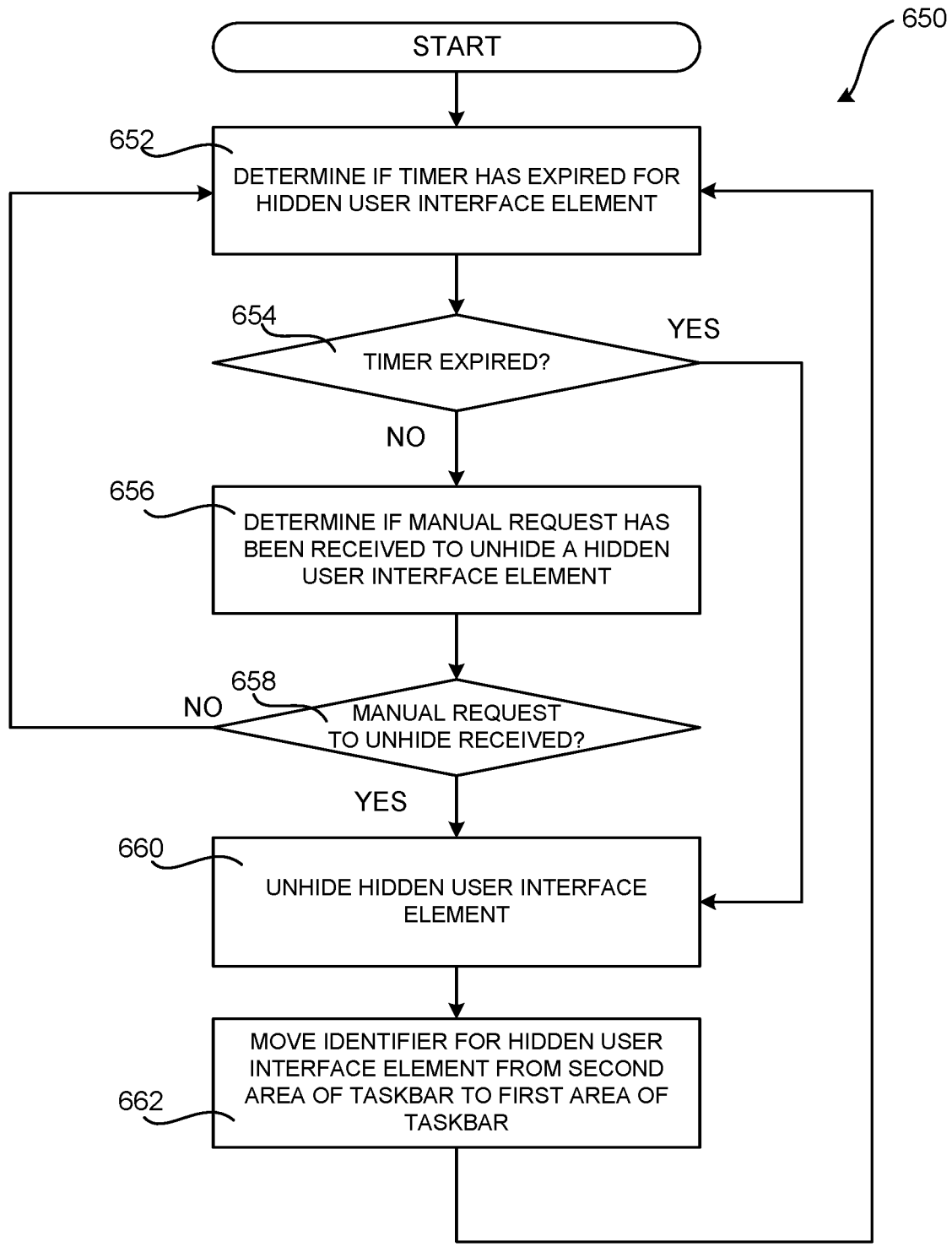
FIG. 6B is a flow diagram showing a routine that illustrates aspects of the operation of the mechanism disclosed herein with reference to FIGS. 1-5A for unhiding hidden UI elements.

FIG. 6B is a flow diagram showing a routine 650 that illustrates aspects of the operation of the mechanism disclosed herein with reference to FIGS. 1-5D for unhiding previously hidden UI elements. The routine 650 begins at operation 652, where a determination is made as to whether the user-specified time for temporarily hiding a UI element has elapsed. If so, the routine 650 proceeds from operation 654 to operation 660, where the previously hidden UI element is unhidden in the manner described above.

If the user-specified time for temporarily hiding a UI element has not elapsed, the routine 650 proceeds from operation 656 to operation 658, where a determination is made as to whether a manual request has been received to unhide a hidden UI element such as through the use of the UI control 302 described above. If such a request has not been received, the routine 650 proceeds back to operation 652. If such a request has been received, the routine 650 proceeds from operation 658 to operation 660, where the UI element is unhidden in the manner described above.

From operation 660, the routine 650 proceeds to operation 662, where the identifier for the newly unhidden UI element may be moved from the second area 118 of the taskbar 104 back to the first area 112 of the taskbar 104 in the manner described above. The routine 650 then proceeds from operation 662 back to operation 652, where additional UI elements can be unhidden in a similar manner.

Figure 7:
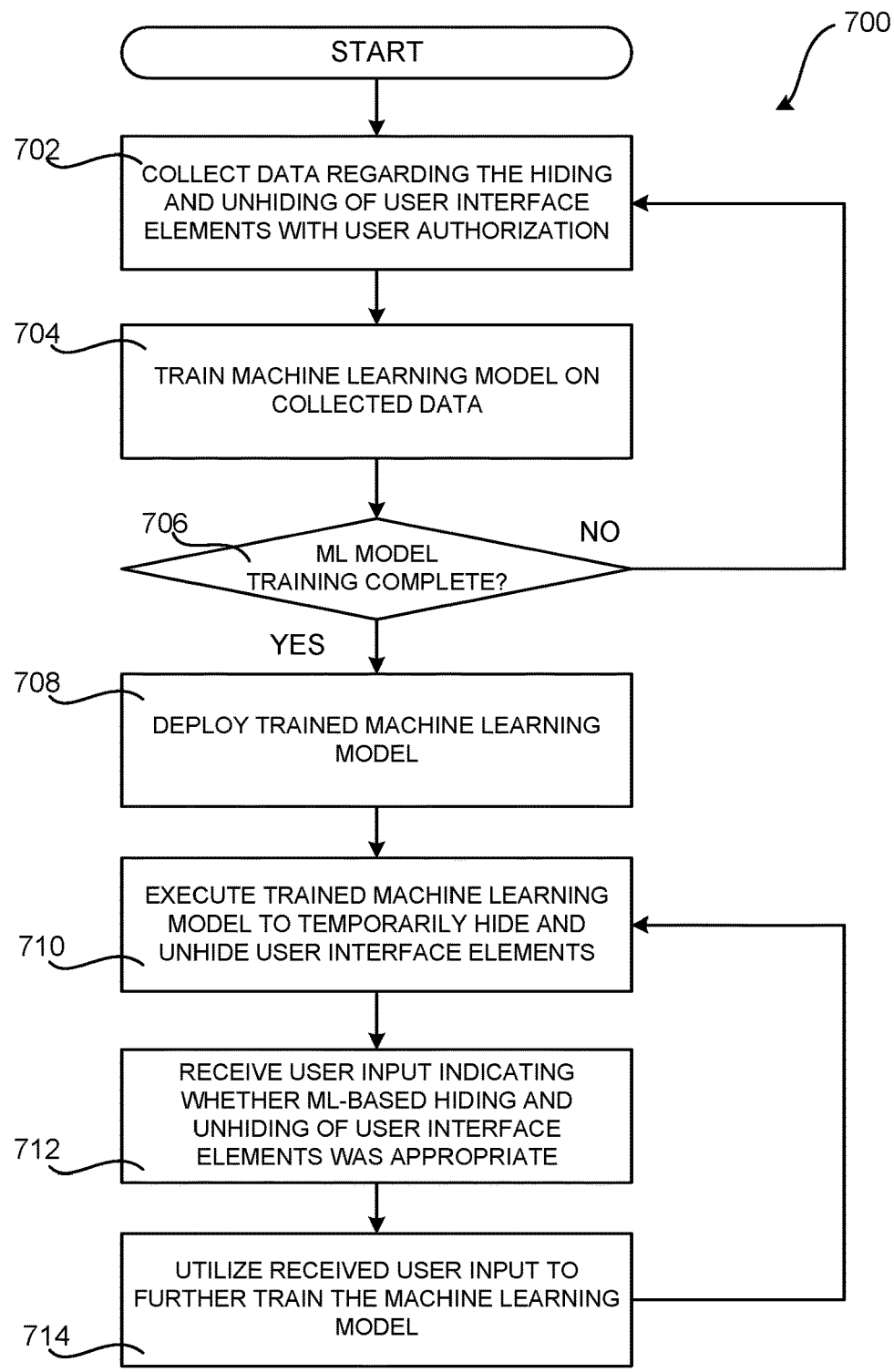
FIG. 7 is a flow diagram showing a routine that illustrates aspects of the operation of one mechanism disclosed herein for utilizing a trained machine learning model to temporarily hide and unhide UI elements, according to one embodiment.

FIG. 7 is a flow diagram showing a routine 700 that illustrates aspects of the operation of one mechanism disclosed herein for utilizing a trained machine learning model 830 (shown in FIG. 8) to temporarily hide and unhide UI elements, according to one embodiment. Using the mechanism described below with reference to FIG. 7, data can be collected (e.g., with a user's express consent) describing the temporary hiding and un-hiding of UI elements using the mechanism described above.

This data can then be utilized to train a machine learning model 830 to automatically hide and unhide UI elements for a user or to suggest that UI elements be hidden and/or unhidden. Such a machine learning model 830 might also make suggestions to a user regarding the hiding of UI elements at a particular time. For example, and without limitation, the machine learning model 830 might learn that a user hides an application window for an e-mail application during their lunch hour (e.g., noon). In response thereto, the machine learning model 830 might ask a user if they would like to hide the application window at the identified time. In this regard, the machine learning model 830 might also be configured to learn the amount of time that a user snoozes UI elements and to automatically hide UI elements for that amount of time or suggest to the user that the UI elements be hidden for that amount of time.

For example, through the collection of data and training of the machine learning model 830, it might be determined that a user temporarily hides certain work-related UI elements during certain periods of time or on weekends. Once such a determination has been made, the machine learning model 830 can be utilized to automatically hide or suggest the hiding of these UI elements at the appropriate time. Additional details regarding this process are provided below with regard to FIG. 7.

In some embodiments, a user can be provided with visibility into the data that has been collected and utilized to train the machine learning model 830 and to delete all or a portion of the data. In these embodiments, the user can also be provided information about why certain recommendations were made by the machine learning model 830. For instance, the collected data that resulted in a recommendation that an email application window be snoozed during the lunch hour might be provided to the user. If the user no longer wanted that particular data to be utilized by the machine learning model 830 to make predictions, the user might be permitted to delete the particular data point. The user might be permitted to modify the data collected and utilized by the machine learning model 830 in other ways in other embodiments.

The routine 700 begins at operation 702, where data is collected describing the temporary hiding and un-hiding of UI elements using the mechanism described above. For example, and without limitation, the data might identify the particular UI elements that were hidden, the day of week and time of day the UI elements were hidden, the day of week and time of day the UI elements were unhidden, and other data describing when and how UI elements were temporarily hidden. As discussed above, this data is collected only with express user consent to do so in advance.

From operation 702, the routine 700 proceeds to operation 704, where a machine learning model 830 is trained to temporarily hide and unhide UI elements based on the data collected at operation 702. Training of the machine learning model 830 can include various types of machine learning including, but not limited to, supervised or unsupervised machine learning, reinforcement learning, self-learning, feature learning, sparse dictionary learning, anomaly detection, or association rules. Accordingly, the trained machine learning model can be implemented as one or more of artificial neural networks, decision trees, support vector machines, regression analysis, Bayesian networks, or genetic algorithms. Other machine learning techniques known to those skilled in the art can also be utilized in other embodiments.

From operation 704, the routine 700 proceeds to operation 706, where a determination is made as to whether training of the machine learning model 830 has completed. If so, the routine 700 proceeds from operation 706 to operation 708, where the trained machine learning model 830 can be deployed for automatically hiding and unhiding UI elements or suggesting the hiding and/or unhiding of UI elements.

From operation 708, the routine 700 proceeds to operation 710, where the trained machine learning model 830 temporarily hides and unhides UI elements or suggests the hiding and/or unhiding of UI elements. The routine 700 then proceeds to operation 712, where user input can be received indicating whether the hiding or unhiding of a UI element was appropriate. For instance, a UI might be provided through which a user can indicate whether the hiding or unhiding of a UI element was desirable. This user input can be utilized at operation 714 to continue training the machine learning model 830 based upon the feedback received from the user. From operation 714, the routine 700 proceeds back to operation 710, where the trained machine learning model 830 can continually hide and unhide UI elements in the manner described above.

It is to be appreciate that, in some embodiments, the machine learning model 830 can collect data from a multitude of users and utilize the data to make predictions as to when and how long UI elements are to be hidden. In these embodiments, additional privacy considerations can be implemented in addition to those described herein such as, for example, anonymization of user identifiers, user data, providing the ability to opt into or out of data collection, and providing the ability to view and delete data collected and utilized to train the machine learning model 830.

Figure 8:
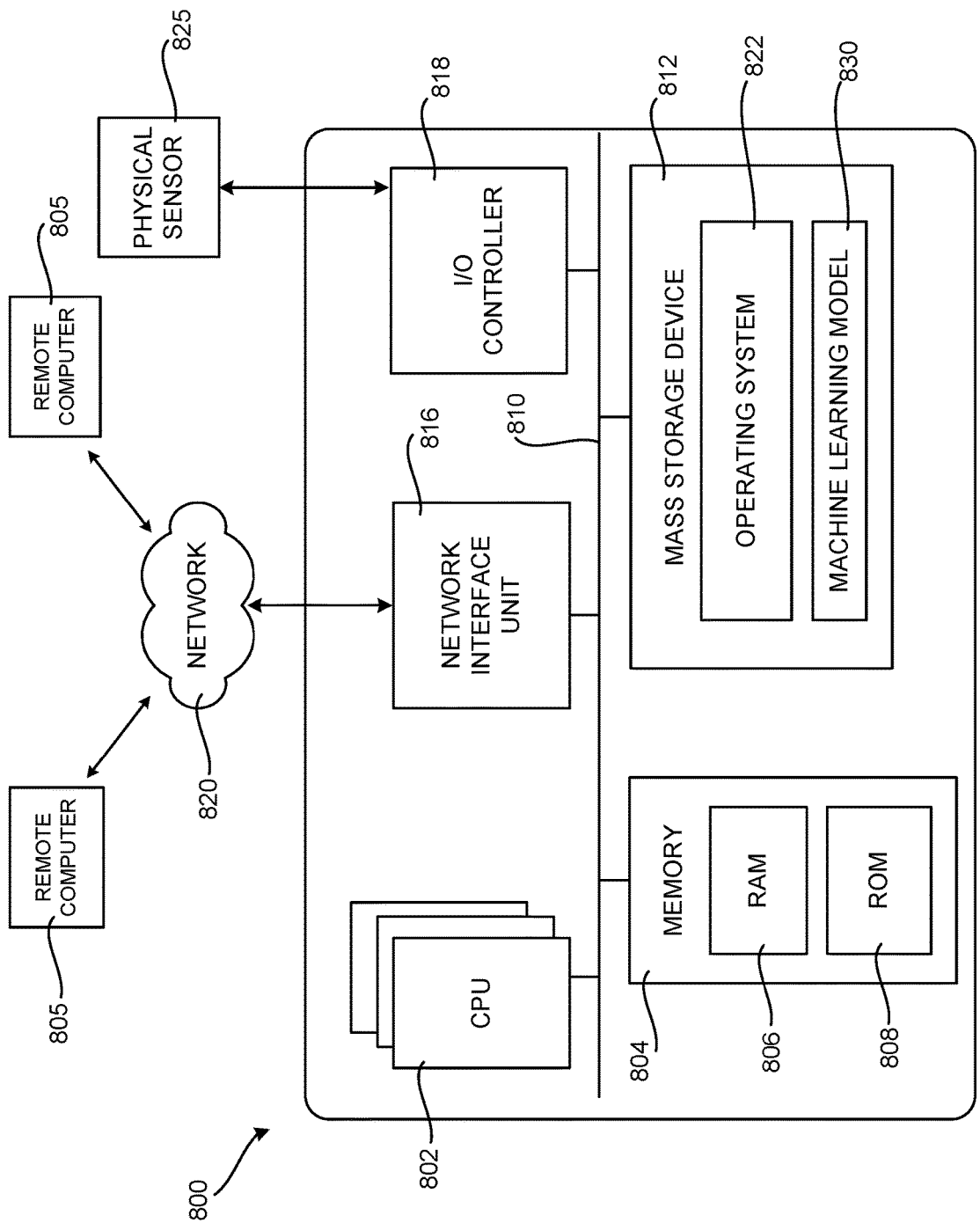
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a computing device that can implement the various technologies presented herein. In particular, the architecture illustrated in FIG. 8 can be utilized to implement a server computer, mobile phone, an e-reader, a smartphone, a desktop computer, an AR/VR device, a tablet computer, a laptop computer, or another type of computing device.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs, and other types of programs. In one embodiment, the operation system 822 provides the functionality described above with regard to FIGS. 1A-7. Other modules or program components can provide this functionality in other embodiments. The mass storage device 812 can also be configured to store other types of programs and data, such as the trained machine learning model 830 described above with regard to FIG. 7.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices, including a keyboard, mouse, touch input, an electronic stylus (not shown in FIG. 8), or a physical sensor such as a video camera. Similarly, the input/output controller 818 can provide output to a display screen or other type of output device (also not shown in FIG. 8).

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
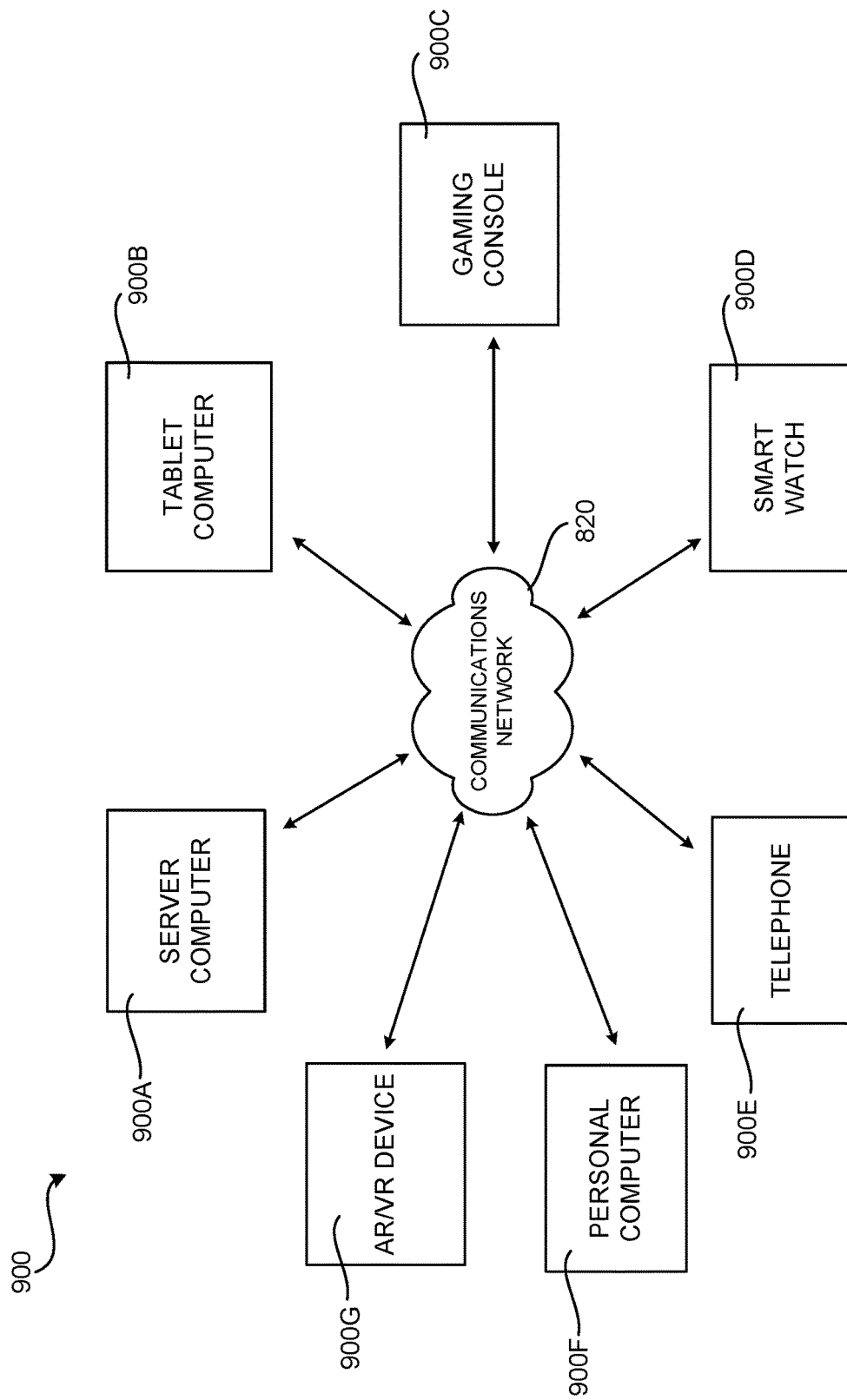
FIG. 9 is a network diagram illustrating a distributed computing environment in which aspects of the disclosed technologies can be implemented.

FIG. 9 is a network diagram illustrating a distributed network computing environment 900 in which aspects of the disclosed technologies can be implemented, according to various embodiments presented herein. As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the client computing devices 900B-900G can be equipped with an operating system operable to support one or more computing applications or terminal sessions such as a web browser (not shown in FIG. 9), or other graphical user interface, including those illustrated above in FIG. 1A-5, or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a client computing device 900B-900G to obtain desired data and/or perform other computing applications.

The data and/or computing applications may be stored on the server 900A, or servers 900A, and communicated to cooperating users through the client computing devices 900B-900G over an exemplary communications network 820. A participating user (not shown in FIG. 9) may request access to specific data and applications housed in whole or in part on the server computer 900A. These data may be communicated between the client computing devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method for temporarily hiding a user interface (UI) element, the method comprising: displaying the UI element; displaying an identifier corresponding to the UI element in a first area of a taskbar; receiving a request to hide the UI element, the request specifying a period of time to hide the UI element; and responsive to the request, hiding the UI element and moving the identifier corresponding to the UI element from the first area of the taskbar to a second area of the taskbar.

Clause 2. The computer-implemented method of clause 1, further comprising: determining if the specified period of time to hide the UI element has elapsed; and responsive to determining that the specified period of time to hide the UI element has elapsed, displaying the UI element and moving the identifier corresponding to the UI element from the second area of the taskbar to the first area of the taskbar.

Clause 3. The computer-implemented method of any of clauses 1 or 2, wherein the request to hide the UI element is received by way of a UI control displayed in response to receiving a selection of the identifier corresponding to the UI element.

Clause 4. The computer-implemented method of any of clauses 1-3, wherein the request to hide the UI element is received by way of a UI control displayed in response to receiving a selection of the UI element.

Clause 5. The computer-implemented method of any of clauses 1-4, wherein the request to hide the UI element is received by way of a UI control displayed in response to receiving a selection of a predefined area in a taskbar.

Clause 6. The computer-implemented method of any of clauses 1-5, wherein the request to hide the UI element is received by way of a UI control displayed in response to determining that the UI element has been dragged to a predefined area in a taskbar.

Clause 7. The computer-implemented method of any of clauses 1-6, further comprising: receiving a request to unhide the UI element while the UI element is hidden; and displaying the UI element prior to the specified period of time elapsing in response to receiving the request to unhide the UI element.

Clause 8. The computer-implemented method of any of clauses 1-7, wherein the request to unhide the UI element while the UI element is hidden is received by way of a UI control displayed in response to receiving a selection of the identifier corresponding to the UI element in the second area of the taskbar.

Clause 9. A computer-readable storage medium having computer-executable instructions stored thereupon which, when executed by a computing device, cause the computing device to: displaying an application window; displaying an identifier corresponding to the application window in a first area of a taskbar; receiving a request to hide the application window, the request specifying a period of time to hide the application window; responsive to the request, hiding the application window and moving the identifier corresponding to the UI element from the first area of the taskbar to a second area of the taskbar; determining if the specified period of time to hide the application window has elapsed; and responsive to determining that the specified period of time to hide the application window has elapsed, displaying the application window and moving the identifier corresponding to the application window from the second area of the taskbar to the first area of the taskbar.

Clause 10. The computer-readable storage medium of clause 9, wherein hiding the application window comprises moving the application window to a virtual desktop.

Clause 11. The computer-readable storage medium of clauses 9 or 10, wherein an application is configured to display the application window and wherein notifications from the application are disabled while the application window is hidden.

Clause 12. The computer-readable storage medium of any of clauses 9-11, wherein an application is configured to display the application window and wherein the application is configured for reduced utilization of computing resources while the application window is hidden.

Clause 13. The computer-readable storage medium of any of clauses 9-12, having further computer-executable instructions stored thereupon which, when executed by the computing device, cause the computing device to present a UI control for extending the period of time to hide the application window prior to the specified period of time to hide the application window elapsing.

Clause 14. The computer-readable storage medium of any of clauses 9-13, wherein the request to hide the application window is received by way of a UI control presented in response to receiving a selection of the identifier corresponding to the application window.

Clause 15. The computer-readable storage medium of any of clauses 9-14, wherein the request to hide the application window is received by way of a UI control presented in response to receiving a selection of the application window.

Clause 16. A computing device, comprising: at least one processor; and a computer-readable storage medium having computer-executable instructions stored thereupon which, when executed by the at least one processor, cause the computing device to: display an application window comprising one or more tabs; receive a request to hide one of the tabs, the request specifying a period of time to hide the tab; hide the tab in response to receiving the request; determine if the specified period of time to hide the tab has elapsed; and display the tab in response to determining that the specified period of time to hide the tab has elapsed.

Clause 17. The computing device of clause 16, wherein the request to hide the tab is received by way of a UI control presented in response to receiving a selection of the tab.

Clause 18. The computing device of clauses 16 or 17, wherein the tab is configured for reduced utilization of computing resources while the tab is hidden.

Clause 19. The computing device of any of clauses 16-18, wherein notifications from the tab are disabled while the tab is hidden.

Clause 20. The computing device of any of clauses 16-19, wherein the computer-readable storage medium has further computer-executable instructions stored thereupon which, when executed by the computing device, cause the computing device to present a UI control for extending the period of time to hide the tab prior to the specified period of time to hide the tab elapsing.

Based on the foregoing, it should be appreciated that technologies for temporarily hiding and unhiding UI elements have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting.

Various modifications and changes can be made to the subject matter described herein without following the example configurations and applications illustrated and described, and without departing from the scope of the present disclosure, which is set forth in the following claims.

What is claimed is:

1. A computer-implemented method comprising:
    displaying a plurality of windows;
    displaying identifiers corresponding to the plurality of windows in a first area of a taskbar, the first area of the taskbar reserved for the identifiers corresponding to non-hidden windows;
    receiving a selection of a predefined area of the taskbar;
    responsive to receiving the selection, presenting a user interface (UI) control comprising first selectable options corresponding to the plurality of windows and second selectable options corresponding to amounts of time;
    receiving a selection of one of the first selectable options corresponding to a first window of the plurality of windows;
    receiving a selection of one of the second selectable options corresponding to a first amount of time;
    in response to receiving the selection of the one of the first selectable options and the selection of the one of the second selectable options, automatically moving the identifier corresponding to the first window of the plurality of windows from the first area of the taskbar to a second area of the taskbar, the second area of the taskbar reserved for the identifiers corresponding to hidden windows, and hiding the first window of the plurality of windows for the first amount of time;
    determining that the first amount of time has elapsed; and
    responsive to determining that the first amount of time has elapsed, displaying the first window of the plurality of windows and automatically moving the identifier corresponding to the first window of the plurality of windows from the second area of the taskbar to the first area of the taskbar.

2. The computer-implemented method of claim 1, wherein the UI control is further displayed in response to receiving a selection of the identifier corresponding to the first window of the plurality of windows.

3. The computer-implemented method of claim 1, wherein the UI control is further displayed in response to receiving a selection of the first window of the plurality of windows.

4. The computer-implemented method of claim 1, wherein the UI control is further displayed in response to determining that the first window of the plurality of windows has been dragged to the predefined area of the taskbar.

5. The computer-implemented method of claim 1, further comprising:
    receiving a request to unhide the first window of the plurality of windows while the first window of the plurality of windows is hidden; and
    displaying the first window of the plurality of windows prior to the first amount of time elapsing in response to receiving the request to unhide the first window of the plurality of windows.

6. The computer-implemented method of claim 5, wherein the request to unhide the first window of the plurality of windows while the first window of the plurality of windows is hidden is received by way of a UI control displayed in response to receiving a selection of the identifier corresponding to the first window of the plurality of windows in the second area of the taskbar.

7. A computing device, comprising:
    at least one processor; and
    a computer-readable storage medium having computer-executable instructions stored thereupon which, when executed by the at least one processor, cause the computing device to:
        display a plurality of windows;
        display identifiers corresponding to the plurality of windows in a first area of a taskbar, the first area of the taskbar reserved for the identifiers corresponding to non-hidden windows;
        receive a selection of a predefined area of the taskbar;
        responsive to receiving the selection, display a user interface (UI) control comprising first selectable options corresponding to the plurality of windows and second selectable options corresponding to amounts of time;
        receive a selection of one of the first selectable options corresponding to a first window of the plurality of windows;
        receive a selection of one of the second selectable options corresponding to a first amount of time;
        in response to receiving the selection of the one of the first selectable options and the selection of the one of the second selectable options, automatically move the identifier corresponding to the first window of the plurality of windows from the first area of the taskbar to a second area of the taskbar, the second area of the taskbar reserved for the identifiers corresponding to hidden windows, and hide the first window of the plurality of windows for the first amount of time;
        determine that the first amount of time has elapsed; and
        responsive to determining that the first amount of time has elapsed, display the first window of the plurality of windows and automatically move the identifier corresponding to the first window of the plurality of windows from the second area of the taskbar to the first area of the taskbar.

8. The computing device of claim 7, wherein the UI control is further displayed in response to receiving a selection of the identifier corresponding to the first window of the plurality of windows.

9. The computing device of claim 7, wherein the UI control is further displayed in response to receiving a selection of the first window of the plurality of windows.

10. The computing device of claim 7, wherein the UI control is further displayed in response to determining that the first window of the plurality of windows has been dragged to the predefined area of the taskbar.

11. The computing device of claim 7, wherein the computer-readable storage medium has further computer-executable instructions stored thereupon to:
    receive a request to unhide the first window of the plurality of windows while the first window of the plurality of windows is hidden; and
    display the first window of the plurality of windows prior to the first amount of time elapsing in response to receiving the request to unhide the first window of the plurality of windows.

12. The computing device of claim 11, wherein the request to unhide the first window of the plurality of windows while the first window of the plurality of windows is hidden is received by way of a UI control displayed in response to receiving a selection of the identifier corresponding to the first window of the plurality of windows in the second area of the taskbar.

13. A computer storage medium having computer-executable instructions stored thereupon which, when executed by a computing device, cause the computing device to:
- display a plurality of windows;
- display identifiers corresponding to the plurality of windows in a first area of a taskbar, the first area of the taskbar reserved for the identifiers corresponding to non-hidden windows;
- receive a selection of a predefined area of the taskbar;
- responsive to receiving the selection, display a user interface (UI) control comprising first selectable options corresponding to the plurality of windows and second selectable options corresponding to amounts of time;
- receive a selection of one of the first selectable options corresponding to a first window of the plurality of windows;
- receive a selection of one of the second selectable options corresponding to a first amount of time;
- in response to receiving the selection of the one of the first selectable options and the selection of the one of the second selectable options, automatically move the identifier corresponding to the first window of the plurality of windows from the first area of the taskbar to a second area of the taskbar, the second area of the taskbar reserved for the identifiers corresponding to hidden windows, and hide the first window of the plurality of windows for the first amount of time;
- determine that the first amount of time has elapsed; and
- responsive to determining that the first amount of time has elapsed, display the first window of the plurality of windows and automatically move the identifier corresponding to the first window of the plurality of windows from the second area of the taskbar to the first area of the taskbar.

14. The computer storage medium of claim 13, wherein the UI control is further displayed in response to receiving a selection of the identifier corresponding to the first window of the plurality of windows.

15. The computer storage medium of claim 13, wherein the UI control is further displayed in response to receiving a selection of the first window of the plurality of windows.

* * * * *